(12) United States Patent
Frank

(10) Patent No.: US 7,497,957 B2
(45) Date of Patent: *Mar. 3, 2009

(54) SYSTEM, METHOD AND APPARATUS FOR END-TO-END CONTROL OF WATER QUALITY

(76) Inventor: Bernard Frank, 4229 Huanui St., Honolulu, HI (US) 96816

(*) Notice: Subject to any disclaimer, the term of this patent is extended or adjusted under 35 U.S.C. 154(b) by 0 days.

This patent is subject to a terminal disclaimer.

(21) Appl. No.: 11/533,821

(22) Filed: Sep. 21, 2006

(65) Prior Publication Data
US 2007/0012628 A1   Jan. 18, 2007

Related U.S. Application Data

(63) Continuation-in-part of application No. 11/183,395, filed on Jul. 18, 2005.

(60) Provisional application No. 60/809,286, filed on May 31, 2006, provisional application No. 60/787,713, filed on Mar. 31, 2006, provisional application No. 60/718,953, filed on Sep. 21, 2005, provisional application No. 60/645,625, filed on Jan. 21, 2005.

(51) Int. Cl.
*C02F 1/00* (2006.01)

(52) U.S. Cl. .......... 210/739; 210/748; 210/85; 210/749; 210/920; 702/184

(58) Field of Classification Search .......... 210/85, 210/739, 820, 748, 749, 920; 702/184
See application file for complete search history.

(56) References Cited

U.S. PATENT DOCUMENTS

| | | | |
|---|---|---|---|
| 5,873,996 A * | 2/1999 | Rozelle et al. | 210/104 |
| 6,099,735 A * | 8/2000 | Kelada | 210/652 |
| 6,379,560 B1 * | 4/2002 | Tilp et al. | 210/748 |
| 6,517,707 B2 * | 2/2003 | Giordano et al. | 210/87 |
| 6,753,186 B2 | 6/2004 | Moskoff | |
| 2002/0130069 A1 | 9/2002 | Moskoff | |
| 2003/0066788 A1 | 4/2003 | Wang et al. | |
| 2003/0145646 A1 | 8/2003 | Henry et al. | |

* cited by examiner

*Primary Examiner*—Walter D Griffin
*Assistant Examiner*—Cameron J Allen
(74) *Attorney, Agent, or Firm*—McKee, Voorhees & Sease, P.L.C.

(57) ABSTRACT

A method of providing end-to-end water quality control from a water system operator to a point of delivery proximate a consumer, which may be at the point of entry, and/or between the point of entry and point of use, and/or at the point of use. The method includes treating the water and delivering the water to the consumer at the point of delivery, filtering/purifying the water at the point of delivery, monitoring water quality at the point of delivery, and reporting water quality at the point of delivery to the water system operator over a network.

20 Claims, 9 Drawing Sheets

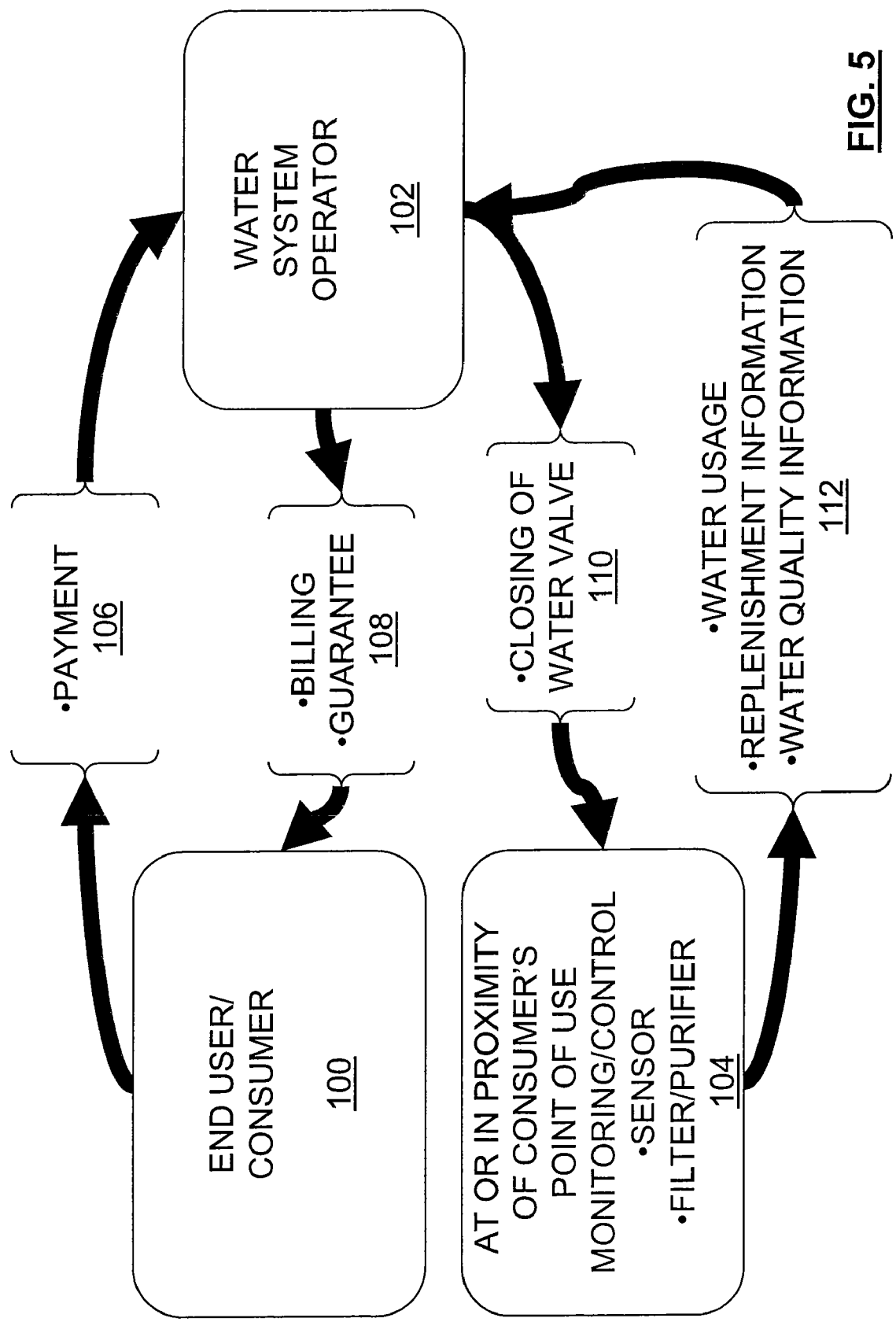

SYSTEM, METHOD AND APPARATUS FOR END-TO-END CONTROL OF WATER QUALITY

CROSS-REFERENCE TO RELATED APPLICATIONS

This application is a continuation-in-part of, and claims priority to U.S. Ser. No. 11/183,395 entitled Method for end-to-end control of water quality, filed Jul. 18, 2005, which claims priority to U.S. Provisional Patent Application No. 60/645,625, entitled System and method for end-to-end control of water quality, filed Jan. 21, 2005, of which all are herein incorporated by reference. This application also claims priority to: U.S. Provisional Patent Application No. 60/718,953 entitled Method for end-to-end control of water quality, filed Sep. 21, 2005; U.S. Provisional Patent Application No. 60/787,713 filed Mar. 31, 2006; and U.S. Provisional Patent Application No. 60/809,286 entitled Method for end-to-end control of water quality, filed May 31, 2006, all of which all are herein incorporated by reference.

BACKGROUND OF THE INVENTION

1. Field of the Invention

The present invention relates generally to a water system operator's end-to-end control of water quality in a water purification and distribution system all the way to an end consumer's point-of-use, at the point-of-entry prior to the point-of-use, near the point-of-entry prior to the point-of-use, etc., and more specifically to a system, method, and apparatus to achieve end-to-end water quality through the controlled distribution of water filtration and purification products.

2. Problems in the Art

The Safe Drinking Water Act (SDWA) was originally passed by Congress in 1974 to protect public health by regulating the nation's public drinking water supply. The law was amended in 1986 and 1996 and requires many actions to protect drinking water and its sources, including rivers, lakes, reservoirs, springs, and ground water wells. The SDWA does not regulate private wells which serve fewer than 25 individuals. The SDWA authorizes the United States Environmental Protection Agency (US EPA) to set national health-based standards for drinking water to protect against both naturally-occurring and man-made contaminants that may be found in drinking water. The US EPA, states, and public and private water systems then work together to make sure that these standards are met.

Millions of Americans receive high quality drinking water every day from their public water systems, (which may be publicly or privately owned). Nonetheless, drinking water safety cannot be taken for granted. There are a number of threats to drinking water: improper disposal of chemicals, animal wastes, pesticides, human wastes, wastes injected deep underground, and naturally-occurring substances can all contaminate drinking water. Likewise, drinking water that is not properly treated or disinfected, or which travels through an improperly maintained distribution system, may also pose a health risk.

Originally, the SDWA focused primarily on treatment as the means of providing safe drinking water at the tap. The 1996 amendments greatly enhanced the existing law by recognizing source water protection, operator training, funding for water system improvements, and public information as important components of safe drinking water. This approach was designed to ensure the quality of drinking water by protecting it from source to tap, but in reality the water supply is of a high quality generally speaking only at the point of distribution at the end a water treatment plant. The total quality of the water degrades continuously along its traverse from the water treatment plant to the end user or consumer's point-of-use. The water quality may degrade as traverses a distribution system that contains lead pipes. In addition, the water at the tap will still contain residual treatment chemicals, such as chlorine. What is needed is a way to ensure end-to-end water quality from the water treatment plant all the way the end user or consumer. What is needed is an end-to-end water quality system that provides filtration and purification of water at the water treatment plant, and then again through a quality assurance process that includes a second filtration and purification process, at, or in the near proximity, of the end user or consumer's point of use.

The SDWA applies to every public water system in the United States. There are currently more than 160,000 public water systems providing water to almost all Americans at some time in their lives. The responsibility for making sure these public water systems provide safe drinking water is divided among US EPA, states, tribes, water systems, and the public. The SDWA provides a framework in which these parties work together to protect this valuable resource. Regardless of various Government Agencies and the public water system policies they establish and enforce for the good of the public, public water can often be sub-standard and questionable in quality, what is needed is an end-to-end control of water system quality by a water system operators from their plants, through their aging distribution systems, across the water meter demarcation to the consumer's point-of-use, such as, but not limited to, a tap, faucet, hydrant, spigot, spout, valve, bib, etc.

The US EPA sets national standards for drinking water based on sound science to protect against health risks, considering available technology and costs. These National Primary Drinking Water Regulations set enforceable maximum contaminant levels for particular contaminants in drinking water or required ways to treat water to remove contaminants. Each standard also includes requirements for water systems to test for contaminants in the water to make sure standards are achieved. In addition to setting these standards, the US EPA provides guidance, assistance, and public information about drinking water, collects drinking water data, and oversees state drinking water programs.

The most direct oversight of water systems is conducted by state drinking water programs. States can apply to the US EPA for "primacy," the authority to implement SDWA within their jurisdictions, if they can show that they will adopt standards at least as stringent as the US EPA's and make sure water systems meet these standards. All states and territories, except Wyoming and the District of Columbia, have received primacy. While no Native American tribe has yet applied for and received primacy, four tribes currently receive "treatment as a state" status, and are eligible for primacy. States, or the US EPA acting as a primacy agent, make sure water systems test for contaminants, review plans for water system improvements, conduct on-site inspections and sanitary surveys, provide training and technical assistance, and take action against water systems not meeting standards.

To ensure that drinking water is safe, the SDWA sets up multiple barriers against pollution. These barriers include: source water protection, treatment, distribution system integrity, and public information. Public water systems are responsible for ensuring that contaminants in tap water do not exceed the standards. Water systems treat the water, and must test their water frequently for specified contaminants and report the results to states. If a water system is not meeting these standards, it is the water supplier's responsibility to notify its customers. Many water suppliers are also now required to prepare annual reports for their customers. The public is responsible for helping local water suppliers to set priorities, make decisions on funding and system improvements, and establish programs to protect drinking water sources. Water systems across the nation rely on citizen advisory committees, rate boards, volunteers, and civic leaders to actively protect this resource in every community in America. Regardless of various Government Agencies and the public water system policies they establish and enforce for the good of the public, public water can often be sub-standard and questionable in quality. What is needed is a way to ensure end-to-end water quality from the water treatment plant all the way the end user or consumer. What is needed is an end-to-end water quality system that provides filtration and purification of water at the water treatment plant, and then again through a quality assurance process that includes a second filtration and purification process, at, or in the near proximity, of the end user or consumer's point of use.

Essential components of safe drinking water include protection and prevention. States and water suppliers must conduct assessments of water sources to see where they may be vulnerable to contamination. Water systems may also voluntarily adopt programs to protect their watershed or wellheads, and states can use legal authorities from other laws to prevent pollution. The SDWA mandates that states have programs to certify water system operators and make sure that new water systems have the technical, financial, and managerial capacity to provide safe drinking water. The SDWA also sets a framework for the Underground Injection Control (UIC) program to control the injection of wastes into ground water. The US EPA and states implement the UIC program, which sets standards for safe waste injection practices and bans certain types of injection altogether. All of these programs help prevent the contamination of drinking water.

The US EPA sets national standards for tap water which help ensure consistent quality in our nation's water supply. Regardless of various Government Agencies and the public water system policies they establish and enforce for the good of the public, public water can often be sub-standard and questionable in quality, what is needed is an end-to-end control of water system quality by a water system operators from their plants, through their aging distribution systems, across the water meter demarcation to the consumer's point-of-use, such as, but not limited to, a tap, faucet, hydrant, spigot, spout, valve, bib, etc.

The US EPA prioritizes contaminants for potential regulation based on risk and how often they occur in water supplies. To aid in this effort, certain water systems monitor for the presence of contaminants for which no national standards currently exist and collect information on their occurrence. The US EPA sets a health goal based on risk (including risks to the most sensitive people, e.g., infants, children, pregnant women, the elderly, and the immuno-compromised). The US EPA then sets a legal limit for the contaminant in drinking water or a required treatment technique, and also performs a cost-benefit analysis and obtains input from interested parties when setting standards. The US EPA is currently evaluating the risks from several specific health concerns, including: microbial contaminants (e.g., *Cryptosporidium* and *Giardia*) the byproducts of drinking water disinfection (radon, arsenic), and water systems that don't currently disinfect their water, but get it from a potentially vulnerable ground water source.

The US EPA provides grants to implement state drinking water programs, and to help each state set up a special fund to assist public water systems in financing the costs of improvements (called the drinking water state revolving fund). Small water systems are given special consideration, since small systems may have a more difficult time paying for system improvements due to their smaller customer base. Accordingly, the US EPA and states provide them with extra assistance (including training and funding) as well as allowing, on a case-by-case basis, alternate water treatments that are less expensive, but still protective of public health.

National drinking water standards are legally enforceable, which means that both the US EPA and states can take enforcement actions against water systems not meeting safety standards. The US EPA and states may issue administrative orders, take legal actions, or fine utilities. The US EPA and states also work to increase the understanding of, and compliance with, standards. The US EPA should strongly consider mandating compliance all the way to the consumer's point-of-use for the good of the public they serve. In addition to an increase in public health, the anti-terrorism benefits are myriad.

The SDWA recognizes that since everyone drinks water, everyone has the right to know what's in it and where it comes from. All water suppliers must notify consumers quickly when there is a serious problem with water quality. Water systems serving the same people year-round must provide annual consumer confidence reports on the source and quality of their tap water. States and the US EPA must prepare annual summary reports of water system compliance with drinking water safety standards and make these reports available to the public. The public must have a chance to be involved in developing source water assessment programs, state plans to use drinking water state revolving loan funds, state capacity development plans, and state operator certification programs.

The Government Performance and Results Act (GRPA) requires government agencies to develop plans for what they intend to accomplish, measure how well they are doing, make appropriate decisions based on the information they have gathered, and communicate information about their performance to Congress and to the public.

The US EPA strategic targets for community water systems in the United States are: 80% of community water systems and 95% of the population served by them are to provide drinking water that meets all existing health-based standards with a compliance date of no later than January 2008.

In order to monitor compliance with these targets, Community Water Systems will be measured on the following health-based violations, which include 1) Maximum Contaminant Level (MCL), 2) Maximum Residual Disinfectant Level (MRDL), and 3) Treatment Technique (TT) violations.

A typical water treatment plant uses the following six step process to process raw water into drinking water. Incoming raw ground or surface water is 1) chlorinated, 2) coagulation, 3) flocculation, 4) sedimentation, 5) chlorination, 6) filtration and release of the finished drinking water into the distribution system. However, water that is not adequately filtered and purified can contain inorganic pollutants such as lead, herbicides, pesticides, insecticides, the gasoline additive MTBE (Methyl Tertiary-Butyl Ether), volatile organic compounds (VOCs), and disinfection byproducts.

In addition, water that is not adequately filtered and purified can contain microbial contaminants that are by far a greater threat that inorganic pollutants. The first is protozoa. Protozoa include the well-known *Giardia*, and the not-so-well-known *Cryptosporidium*. These two protozoa have been detected in 90% of U.S. surface water. Protozoa are the largest organisms of the three categories, ranging in size from 1-16 microns. They are more resistant to disinfection by iodine or chlorine than either bacteria or virus, but can be effectively filtered. *Giardia* is relatively large and easy to catch, but *Cryptosporidium* is more likely to pass through units which depend upon filtration for parasite removal. The second category is bacteria. Bacteria include such commonly-known organisms as *Campylobacter, E. coli, Vibrio cholera*, and *Salmonella*. Bacteria are intermediate-sized organisms, ranging from 0.2 to about 10 microns. The third category is viruses. Commonly known viruses include Rotavirus, Hepatitis A, Norwalk, and Polio. Viruses are truly tiny; they range in size between 0.02 and 0.085 microns, which makes them extremely difficult to filter. Viruses respond well to disinfection, and can be effectively inactivated using a purifier proven to remove or inactivate 99.99% of virus.

In addition, public drinking water may have an objectionable turbidity, contain hydrogen sulfide, may be too acidic or alkaline, or may contain radon or radium.

Water treatment plants may also replace the chlorination of incoming raw water with an ozone process. Intermediate filters, and biological filters may be added to the process, but 98% of the water treatment plants in the United States chlorinate the processed drinking water that is released in the distribution system. There exists a tension between the positive benefits of chlorinating water and the increasing amount of research related to the negative effects of chlorinating water.

Chlorine has been linked to several different kinds of cancer, learning disorders in children, heart trouble, premature senility, hypertension in adult males, and birth defects.

On the other hand, chlorination has played a critical role in protecting the United States' drinking water supply from waterborne infectious diseases for 90 years. The filtration, purification, and disinfection of drinking water have been responsible for a large part of the 50 percent increase in life expectancy in this century. The filtration and purification by chlorination of drinking water is undoubtedly the most significant public health advance of the past 1,000 years. However, water that is not adequately filtered and purified can contain inorganic pollutants such as lead, herbicides, pesticides, insecticides, the gasoline additive MTBE (Methyl Tertiary-Butyl Ether), volatile organic compounds (VOCs), and disinfection byproducts.

In addition, water that is not adequately filtered and purified can contain microbial contaminants that are by far a greater threat that inorganic pollutants. The first is protozoa. Protozoa include the well-known *Giardia*, and the not-so-well-known *Cryptosporidium*. These two protozoa have been detected in 90% of U.S. surface water. Protozoa are the largest organisms of the three categories, ranging in size from 1-16 microns. They are more resistant to disinfection by iodine or chlorine than either bacteria or virus, but can be effectively filtered. *Giardia* is relatively large and easy to catch, but *Cryptosporidium* is more likely to pass through units which depend upon filtration for parasite removal. The second category is bacteria. Bacteria include such commonly-known organisms as *Campylobacter, E. coli, Vibrio cholera*, and *Salmonella*. Bacteria are intermediate-sized organisms, ranging from 0.2 to about 10 microns. The third category is viruses. Commonly known viruses include Rotavirus, Hepatitis A, Norwalk, and Polio. Viruses are truly tiny; they range in size between 0.02 and 0.085 microns, which makes them extremely difficult to filter. Viruses respond well to disinfection, and can be effectively inactivated using a purifier proven to remove or inactivate 99.99% of virus.

In addition, public drinking water may have an objectionable turbidity, contain hydrogen sulfide, may be too acidic or alkaline, or may contain radon or radium.

Chlorinated drinking water's chief benefit is the protection of public health through the control of waterborne diseases. It plays a paramount role in controlling pathogens in water that cause human illness, as evidenced by the virtual absence of waterborne diseases such as typhoid and *cholera* in developed countries.

Untreated or inadequately treated drinking water supplies remain the greatest threat to public health, especially in developing countries, where nearly half the population drinks contaminated water. In these countries, diseases such as *cholera*, typhoid and chronic dysentery are endemic and kill young and old alike. In 1990, over three million children under the age of five died of diarrheal diseases. Unfortunately, the availability of safe drinking water in many areas is practically nonexistent, due to poverty, poor understanding of water contamination, and lack of a treatment and delivery infrastructure.

International assistance groups, including the World Health Organization and the Pan American Health Organization (PAHO), have long-standing technical assistance and education programs to improve water supply and sanitation practices. It has been estimated that such improvements—including chlorine disinfection—can prevent 25 percent of all diarrheal outbreaks and reduce childhood mortality by equal levels.

An example of the continuing public health threat from waterborne disease outbreaks occurred in Peru in 1991, where a major causative factor was the absence or inadequacy of drinking water disinfection. This failure to disinfect was partly based on concern about U.S. reports on disinfection by-products. The result: a five-year epidemic of *cholera*, its first appearance in the Americas in this century. The epidemic spread to 19 Latin American countries and has been only partially abated through public health interventions supported by PAHO's advice and technical assistance. Nearly a million cases and 10,000 deaths have been reported.

These statistics strongly reinforce the concept that water disinfection must be a primary tool in protecting public health worldwide. As noted by the American Academy of Microbiology, "The single, most important requirement that must be emphasized is that disinfection of a public water supply should not be compromised."

At the 1992 First International Conference on the Safety of Water Disinfection, several researchers described the costs associated with microbiological disease as well as the benefits of illness avoided through water treatment. Real health care savings can be realized from preventing and eliminating microbial contamination in drinking water supplies.

In his conference presentation, Dr. Pierre Payment of the University of Quebec stated that the "social cost of 'mild' gastrointestinal illness in industrialized countries is several orders of magnitude higher than costs associated with acute hospitalized cases." For example, in the United States, annual costs were estimated to be $9.5 billion (1985 dollars) for cases with no consultation with a physician, $2.7 billion for those with consultations, and only $760 million for those requiring hospitalization.

Dr. Payment presented data estimating that in 1985; about 500,000 hospitalizations and 3,000 deaths were due to gastrointestinal illnesses in the United States, the majority being of unknown origin. His study assumed that these numbers are grossly underestimated due to unreported or unidentified illnesses. Over 13 percent were due to viral illnesses, 4.9 percent were bacterial and 1.1 percent was parasitic. About 80 percent were presumed noninfectious. One out of ten deaths from gastroenteritis could be due to viruses.

Commenting on Dr. Payment's report, the American Academy of Microbiology noted, "A decrease in morbidity and mortality is not the only benefit which should be considered in a cost-benefit analysis . . . . The benefits of microbiologically safe water go beyond the absence of disease, and affect the productivity of industry, as well as the prices of goods and services."

At the same conference, a paper by Gunther F. Craun et al. discussed the cost-effectiveness of water treatment for pathogen removal. An evaluation of five pathogens and treatment costs shows the favorable economic benefits of preventing infectious waterborne diseases. The report concluded that "municipal water systems designed to prevent waterborne infectious disease are one of the most effective investments of public funds that society can make. Even conservative estimates under worst-case conditions show benefit-cost ratios of 3:1 for small systems and 8:1 for large systems. Pathogen-free drinking water is a bargain." Regarding comparison of these benefits with potential cancer risks associated with drinking water disinfection, the group noted that the costs of preventing the relatively small carcinogenic risks may not be warranted in light of many other public health risks that should be reduced. Regardless of various Government Agencies and the public water system policies they establish and enforce for the good of the public, public water can often be sub-standard and questionable in quality, what is needed is an end-to-end control of water system quality by a water system operators from their plants, through their aging distribution systems, across the water meter demarcation to the consumer's point-of-use, such as, but not limited to, a tap, faucet, hydrant, spigot, spout, valve, bib, etc.

The addition of chlorine to our drinking water started in the late 1890's and had wide acceptance in the United States by 1920. Joseph Price, M. D, wrote a fascinating yet largely ignored book in the late 1960's, entitled Coronaries Cholesterol. Chlorine, Dr Price believes, is the primary and essential cause of atherosclerosis is chlorine. "Nothing can negate the incontrovertible fact the basic cause of atherosclerosis and resulting entities, such as heart attacks and most common forms of stokes is chlorine. The chlorine contained in processed drinking water."

This conclusion is based on experiments using chlorine in the drinking water of chickens. The results: 95% of the chickens given chlorine added to distilled water developed atherosclerosis within a few months.

Atherosclerosis, heart attacks and the resulting problems of hardening of the arteries and plaque formation is really the last step in a series of biochemical malfunctions. Price points out it takes ten to twenty years before symptoms in humans become evident. In many ways, this is reminiscent of cancer which can take twenty to thirty years to develop.

Can chlorine be linked to cancer too? In the chlorination process itself, chlorine combines with natural organic matter decaying vegetation to form potent cancer causing trihalomethanes (THM's) or haloforms. Trihalomethanes collectively include such carcinogens as chloroforms, bromoforms carbon tectachloride, bischlorothane and others. The amount of THM's in our drinking water is theoretically regulated by the EPA. Although the maximum amount allowed by law is 100 ppb, a 1976 study showed 31 of 112 municipal water systems exceeded this limit.

According to some studies by 1975, the number of chemical contaminants found in finished drinking water exceeded 300 ppb. In 1984 over 700 chemicals had been found in our drinking water. The EPA has targeted 129 of these chemicals as posing the greatest threat to our health. Currently the EPA enforces federal standards for 34 drinking water contaminants. In July, 1990 they proposed adding 23 new ones and expects this list to grow to 85 in 1992.

Another report claims the picture is much worse. According to Troubled Waters on Tap "over 2100 contaminants have been detected in U. S. drinking water since 1974 with 190 known or suspected to cause adverse health effects at certain concentration levels. In total, 97 carcinogens and suspected carcinogens, 82 mutagens and suspected mutagens, 28 acute and chronic toxic contaminants, and 23 tumor promoters have been detected in U. S. drinking water since 1974.

Compounds in this concentration could pose serious toxic effects, either alone or in combination with other chemicals found in drinking water. Overall, available scientific evidence continues to substantiate the link between consumption of toxins in drinking water and serious public health concerns. Studies have strengthened the association between ingestion of toxins and elevated cancer mortality risks. Studies in New Orleans, Louisiana; Eric County, New York, Washington County Maryland, and Ohio County, Ohio reveal high levels of haloforms or THM's in drinking water which results in higher levels of cancer.

The continued use of chlorine as the main drinking water disinfectant in the United States only adds to the organic chemical contamination of drinking water supplies. The current federal standard regulation of trihalomethanes do not adequately protect water consumers from the multitude of other organic chlorination by-products that have been shown in many studies to be mutagenic and toxic'

"Chlorine is so dangerous" according to biologist/chemist Dr. Herbert Schwartz," that it should be banned. Putting chlorine in the water is like starting a time bomb. Cancer, heart trouble, premature senility, both mental and physical are conditions attributable to chlorine treated water supplies. It is making us grow old before our time by producing symptoms of aging such as hardening of the arteries. I believe if chlorine were now proposed for the first time to be used in drinking water it would be banned by the Food and Drug Administration."

The disinfection byproducts debate has led some people to think that chlorine's use in drinking water treatment will diminish. This is highly unlikely. Other disinfectants also produce byproducts. Furthermore, chlorine is the disinfectant of choice for drinking water for a number of reasons. Its wide range of benefits can not be provided by any other single disinfectant. Chlorine-based disinfectants are the only disinfectants that provide a residual in the distribution system. This residual is an important part of the multi-barrier approach to preventing waterborne disease. The increasing need to disinfect groundwater systems may actually increase the use of chlorine for drinking water disinfection.

According to the World Health Organization, disinfection by chlorine is still the best guarantee of microbiologically safe water and is unlikely to change in the near future. What is needed is a way to ensure end-to-end water quality from the water treatment plant all the way the end user or consumer that removes any residual chlorine. What is needed is an end-to-end water quality system that provides filtration and purification of water at the water treatment plant, and then again through a quality assurance process that includes a second filtration and purification process, or in the near proximity, of the end user or consumer's point of use.

Many municipalities are experimenting with a variety of disinfectants to either take the place of chlorine or to be used in addition, as a way of cutting down on the amount of chlorine added to the water. However, these alternatives such as chlorine dioxide, bromine chloride, chloromines, etc., are just as dangerous as chlorine. We're replacing one toxic chemical with another.

There are other more appropriate ways to reduce disinfection byproducts such as precursor removal technologies that will not produce new disinfection byproducts. On the positive side, some cities are starting to use aeration carbon filtration, ultraviolet light and ozone as safe alternatives to chemical disinfectants. But the number of cities and the number of people getting water from these methods is minimal.

In the post 9/11 world the contamination of water with biological, chemical or radiological agents has forced the medical community, public health agencies and water utilities to consider the possibility of intentional contamination of US water supplies as part of an organized effort to disrupt and damage important elements of the US national infrastructure. In President Bush's 2002 State of the Union Address, it was noted that confiscated Al Qaeda documents included detailed maps of several US municipal drinking water systems. Some steps have been taken to protect and monitor the US drinking water supply, but currently, it is the healthcare providers that are likely to be the first to observe unusual patterns of illness resulting from the intentional introduction of biological, chemical or radiological agents in the drinking water supply by terrorists. The government has dealt primarily the large scale attacks on the drinking water supply by terrorist, but not adequately with the small scale attacks between the water system operator's plant and the consumer.

In order to minimize liability while increasing the overall health of the public, there is a need to disinfect drinking water inexpensively prior to distribution and a need to purify the disinfectant used by the water system operator and to filter out contaminants, such as, but not limited to, lead from lead pipes, and acts of terrorism before flowing from the consumer's point-of-use, in order to control the quality of water end-to-end in a water filtration and purification distribution system. What is needed is a way to ensure end-to-end water quality from the water treatment plant all the way the end user or consumer that removes any lead and/or other contaminants that are introduced into the water supply after it leaves the water treatment plant. What is needed is an end-to-end water quality system that provides filtration and purification of water at the water treatment plant, and then again through a quality assurance process that includes a second filtration and purification process, at, or in the near proximity, of the end user or consumer's point of use.

Many pipes in the ground are typically on a 50 year depreciation schedule with 100 year life cycle expectancy, and water system operators face infrastructure replacements issues that are massive, particularly in older cities. The present invention's water system operator's use of water filter/purifiers located near the consumer's point-of-use, at the point-of-entry prior to the point-of-use, near the point-of-entry prior to the point-of-use, etc. will dramatically improve the quality of water to the consumer while allowing water system operators to upgrade their distribution systems on a schedule that is manageable. The only way to ensure the quality of water is through the use of "post treatment/post distribution" water filter/purifiers controlled by the water system operator and placed near the consumer's point-of-use, at the point-of-entry prior to the point-of-use, near the point-of-entry prior to the point-of-use, etc. The present invention is a revolutionary concept for a water system operator to adopt and make an integral part of their program.

In April of 2004 the Subcommittee on Water Resources and Environment held a hearing on the state of the United State's aging water supply infrastructure. Concern has been heightened recently over the condition of the nation's water supply infrastructure as a result of the presence of lead pipes in the District of Columbia's drinking water system. The Subcommittee will receive testimony from representatives of the American Water Works Association (AWWA), the Association of Metropolitan Water Agencies (AMWA), the National Rural Water Association, and the U.S. Conference of Mayors' Urban Water Council.

Our nation has over 54,000 community water systems. These systems consist of a substantial amount of infrastructure, including collection devices, drinking water treatment plants, wells, pumps, storage facilities, transmission and distribution water mains, service lines, and other equipment to deliver water. They provide about 90 percent of Americans with their tap water. Approximately 3,000 of these community systems provide more than 75 percent of the nation's water. Our nation's drinking water infrastructure is an asset that all Americans rely on every day. It is a cornerstone of both our nation's economic well-being and our public health. Largely buried underground and invisible to the average American, it is also an asset many have taken for granted.

The greatest challenge facing community water systems today is aging pipes and other water infrastructure. It is not uncommon in older systems to find pipes that were laid in the 19th century. Due to patterns of investment made to serve population growth beginning well over a century ago, water utilities are experiencing an urgent and increasing need to repair and replace this aging infrastructure. As many communities are finding, failure to repair and replace aging infrastructure can result in a loss of valuable water resources, significant economic impacts, and increased risks to public health.

In many cities and towns, water infrastructure has been in place for many decades. Quite often, particularly in the larger cities, components of these systems (such as the water mains) are more than a century old. The oldest cast iron pipes, dating to the latter 1800s, have an average life expectancy of 100-120 years. Because of changing materials and manufacturing techniques, pipes laid in the 1920s have an average life expectancy of nearly 100 years, and those laid in the post-World War II boom are expected to last about 75 years. At this point, these life expectancies are being approached or exceeded in many cities and towns. As the water infrastructure outlives its useful life, it can corrode and deteriorate, resulting in an epidemic of water leakage, burst water mains, unreliable pumps and collection equipment, and aging treatment plants that fail to remove important contaminants. With age and increased demands due to population growth, drinking water infrastructure problems in many cities are growing.

One of the most common problems is water loss from water distribution systems. In most water systems, a large percentage of the water is lost in transit from treatment plants to consumers. The amount of water that is lost is typically 20-30 percent of production. Some systems, especially older ones, may lose as much as 50 percent.

Leakage is usually the major cause of water loss. There are many possible causes of leaks, and often a combination of factors leads to their occurrence. Leakage occurs in various components of the distribution system, including transmission pipes, main distribution pipes, service connection pipes, joints, valves, and fire hydrants. The material, composition, age, and joining methods of the distribution system components can influence leak occurrence. Causes of leaks include corrosion, cracks, material defects or failure due to deterioration over time, faulty installation, inadequate corrosion protection, ground movement over time due to drought or freezing, and repeated excessive loads and vibration from road traffic. Old pipes often leak substantial amounts of water through corroded areas, cracks, and loose joints.

Leaks waste both money and a precious natural resource. The primary economic loss is the cost of the lost raw water, its treatment, and its transportation. Leakage leads to additional economic loss in the form of damage to the pipe network itself. Such damage may include erosion of pipe bedding and pipe breaks, and damage to the foundations of roads and buildings. Leaks also waste substantial amounts of water resources. This is particularly critical in areas where the demand for water is outstripping available supplies. The City of Detroit illustrates the potential cost of water as a lost commodity. In Detroit, citizens endure annual mid-summer water rationing and pressure problems, yet they pay an estimated $23 million per year for water that never reaches their homes and businesses, because over 35 billion gallons of water leak from the Detroit water system each year. The lost water is reflected in bills paid by every household whose water comes from the Detroit system. This is on top of the $1 million the water utility has been spending annually on leak detection and repair, and an ongoing $7 billion capital improvement program.

The problems associated with gradual leakage are compounded when old water mains and other pipes in the water distribution system burst, resulting in the sudden loss of water pressure, flooding, and the loss of even more water. It is common for cities to have scores, hundreds, and even more than a thousand water main breaks each year. For example, last year, there were 1,190 reported breaks along the City of Baltimore's 3,400 miles of water mains, which deliver drinking water to taps across the city and surrounding counties. This is more than three times per day on average. There were 1,140 breaks in 2002. Philadelphia, with a similar amount of pipe, reportedly has an average of 788 ruptures per year, and New York, which has 6,000 miles of mains, has an average of 550 annual breaks. Boston, which has 1,023 miles of pipe, averages 35 breaks per year.

A "reasonable goal" for water systems in North America is 25 to 30 breaks per 100 miles of pipe per year, according to a 1995 American Water Works Association Research Foundation report, Distribution System Performance Evaluation. Baltimore is somewhat above that mark, with an average of 34 breaks per 100 miles over the past two years. Not far behind is the Washington Suburban Sanitary Commission, with 33 breaks per 100 miles. Detroit is worse off, with an average of 45 breaks. Several other cities met the goal, some of them relatively young, affluent communities with moderate weather, but also some of them old, less economically vibrant, and in harsh climates. For every 100 miles of pipe, Phoenix had 29 breaks per year; Pittsburgh had 23, and Hartford 20. Chicago and Providence each had 9. San Diego had 5.

In addition to the substantial direct costs of repairing and replacing burst water pipes, millions of dollars in economic losses are incurred nationally each year as a result of businesses and schools forced to close, flooding and other property damage, closed roads, snarled traffic, and the like. For example, a 36-inch water main which burst in New York City a couple of years ago resulted in severe physical damage because of the ensuing flooding to 14 businesses and business disruptions to an additional 120 businesses, resulting in several hundred thousand dollars in gross revenue loss from the one incident. Small business disaster assistance was made available for the impacted businesses. In Cleveland, a major, 87-year-old water main broke four years ago, flooding downtown streets with some 25 million gallons of water, stranding cars in the flood, closing many businesses and all schools, including Cleveland State University, and leaving 100,000 people without water for a few days. Downtown Cleveland had a second major water-main break about eight months later.

Measures are available to water utilities for reducing water main breaks and other losses of water from their systems. Fundamentally, they involve improved management of a water system's assets. Asset management approaches aim to minimize the total cost of buying, operating, maintaining, replacing, and disposing of capital assets during their life cycles, while achieving service goals. Measures include the systematic collection of key data about the water system; the application of life-cycle cost analysis and risk assessment to set goals and priorities; a systematic program of inspections, monitoring, and leak detection and repair; system maintenance, rehabilitation, and replacement of old pipes and other equipment found to be in need of repair; and corrosion control to reduce the effect of corrosive water on the system.

The General Accounting Office (GAO) issued a report, dated March 2004, in which GAO found that comprehensive asset management has the potential to help utilities better identify needs and plan future investments. Water utilities that GAO reviewed reported that comprehensive asset management provided them with a better understanding of their maintenance, rehabilitation, and replacement needs and thus helped utility managers make better system management and investment decisions. GAO also found that, although smaller utilities face more obstacles to implementing asset management, largely as a result of limited resources, such utilities can also benefit from applying asset management concepts. GAO concluded that EPA can play a stronger role in encouraging water utilities to use asset management by leveraging ongoing efforts within and outside the Agency. Some utilities already are implementing asset management approaches.

The loss of water pressure from water main breaks or other equipment breakdowns also can result in serious contamination of the water supply, thereby creating a public health risk. Additionally, old or poorly maintained pipes may harbor bacteria and other pathogens that can make people sick. Water distribution systems depend on pressure inside the pipes to keep out contamination. If the water pressure drops due to pipe breaks, significant leakage, or pump failures, the possibility increases of bacteria and other contaminants infiltrating into the pipes through leak openings, such as corroded areas, cracks, and loose joints, and contaminating the water. Water utilities typically issue boil-water advisories to customers once water pressure is restored.

Moreover, many older water distribution systems used lead pipes to distribute tap water. Municipalities first installed lead pipes during the late 19th Century. In 1897, about half of all American municipalities used at least some lead water pipes. Lead had two features that made it attractive to the engineers who designed public water systems: it was both malleable and durable. Malleability reduced labor costs by making it easier to bend the service main around existing infrastructure and obstructions, and compared to iron, lead was a soft and pliable metal. As for durability, the life of the typical lead service pipe was considerably longer than plain iron or steel, galvanized, or cement lined pipe. Based solely on engineering concerns, these characteristics made lead an ideal material for service lines. From a narrow engineering stand point, it is clear that lead worked well, when one examines how popular lead service lines were. At the turn of the 20th Century, the use of lead pipes was widespread, particularly in medium and large cities.

However, the use of lead pipes has had public health implications. Studies show that ingested lead can have adverse neurological, toxicological, and developmental effects on humans, particularly children. In cities that used lead water pipes, it appears there were some people who were affected by lead, although the effects of lead water lines varied across cities, and depended on the age of the pipe and the corrosiveness of the associated water supplies. The age of pipe influenced lead content because, over time, oxidation formed a protective coating on the interior of pipes. As for corrosiveness, acidic water leached more lead from the interior of pipes than did non-acidic water.

Over time, the public health implications of lead pipes became better understood, and other materials were used in place of lead pipes. Today, most lead pipes have been replaced with more modern and safer materials, although some cities still have some areas with lead service lines to older buildings and lead-containing packing materials used to seal joints between some pipes. The City of Chicago is reported to have the highest concentration of lead pipes in the nation. Lead service lines remain in some areas in the District of Columbia. The presence of lead materials in water systems is significant because the water passing through lead service lines and joint packing materials could be corrosive, thereby leaching lead from the lines and packing materials and increasing lead levels in the drinking water.

Measures that can be taken by water utilities to reduce lead levels in drinking water include locating and replacing the remaining lead service lines, and reducing the corrosiveness of the water. Many cities that have lead service lines have adjusted their water treatment processes to minimize corrosion. Some, such as Chicago and Philadelphia, add phosphates to the water at their treatment plants. The phosphates, in combination with the natural calcium and magnesium minerals in the water, coat the pipes internally to prevent lead from leaching into the water. The water supplier for the District of Columbia has not adjusted its water treatment to minimize corrosion, and hence, elevated lead levels have been reported in drinking water at some locations. In response to the elevated lead levels that were found, the District's water supplier now is considering adjusting its water treatment processes to add phosphates to the water. It is unclear whether the addition of phosphates to the District's water will ultimately result in any undesirable increases in phosphorus loadings to the Chesapeake Bay from the District's wastewater discharges.

Historically, there had been little Federal assistance for drinking water systems. Local communities and private companies built most of the municipal water systems around the country. Before 1996, the primary source of Federal funding was the U.S. Department of Agriculture (USDA). Through its Rural Utilities Service, USDA has provided both municipal water supply and wastewater treatment assistance of over $600 million a year to communities with populations of less than 10,000.

Following enactment of the 1996 Safe Drinking Water Act Amendments, Congress began providing grants to states to capitalize Drinking Water State Revolving Loan Funds, modeled after the Clean Water State Revolving Loan Funds. Through fiscal year 2004, Congress has provided approximately $7 billion for the Drinking Water State Revolving Loan Funds. Approximately 40 percent of that assistance has been provided for projects to meet treatment needs, and around 30 percent has been for projects to meet transmission and distribution needs. The remaining 30 percent has been provided for water storage, developing sources, technical assistance, and other drinking water needs.

The U.S. Environmental Protection Agency (EPA) submitted a 1999 Drinking Water Needs Survey to Congress in Feb. 2001, pursuant to the Safe Drinking Water Act. The 1999 Needs Survey estimated drinking water infrastructure needs at approximately $150 billion over the next 20 years. Over half of the total drinking water infrastructure needs (56 percent) are for transmission and distribution systems (pipes). Twenty-one percent of the needs are for infrastructure to meet regulatory requirements. The remaining 19 percent of needs are for storage facilities, developing sources, and other needs. EPA acknowledges that its survey likely underestimates needs for transmission and distribution systems because many systems do not have a plan in place for replacing pipes. The Drinking Water Needs Survey is based on documented needs, which only provide an estimate of needs over 5 to 10 years.

In May 2001, the American Water Works Association (AWWA) released a report entitled, "Reinvesting in Drinking Water Infrastructure—Dawn of the Replacement Era." In that report, AWWA projected that expenditures on the order of $250 billion over 30 years might be needed nationwide for the replacement of worn-out drinking water pipes and associated structures (valves, fittings, etc). This figure does not include wastewater infrastructure or the cost associated with complying with new drinking water standards. A September 2002 EPA report projected that expenditures of $120 billion over the next 20 years might be needed for the replacement of drinking water transmission lines and distribution mains, and another $97.6 billion might be needed for non-pipe (treatment, source, and storage) needs.

Clearly there is an unfilled need for a way to ensure end-to-end water quality from the water treatment plant all the way the end user or consumer that removes any contaminants that are introduced into the water supply after it leaves the water treatment plant. In addition, there is an unfilled need for a way to ensure end-to-end water quality from the water treatment plant all the way to the end user or consumer that removes any residual chemicals used in the water treatment process at the water treatment plant that are still present at the end user or consumer's point of use. What is needed is an end-to-end water quality system that provides filtration and purification of water at the water treatment plant, and then again through a quality assurance process that includes a second filtration and purification process, at, or in the near proximity, of the end user or consumer's point of use. This quality assurance process that includes a second filtration and purification process at, or in the near proximity, of the end user or consumer's point of use preferably should include an automatic or semi-automatic method of providing feedback concerning the actual or predicted condition of the water filter/purification unit. This feedback would be used as a metric to build, stock, and ship a new replaceable water filter/purifier cartridge to the end user or consumer.

Clearly, there is therefore an unfilled need for a system, method, and apparatus which solves these and other problems. The present invention has as its primary objective fulfillment of this need.

FEATURES OF THE INVENTION

A general feature of the present invention is the provision of system, method, and apparatus for the end-to-end control of water system quality by a water system operator, such as, but not limited to public and private water utilities or departments, and other providers, to the consumer's point-of-use through the controlled distribution of water filtration and purification products which overcomes the problems found in the prior art.

A general feature of the present invention is the provision of system, method, and apparatus for the end-to-end control of water system quality by a water system operator, such as, but not limited to, public and private water utilities or departments, and other providers, to the end consumer's point-of-use, at the point-of-entry prior to the point-of-use, near the point-of-entry prior to the point-of-use, etc, through the controlled distribution of water filtration and purification products which overcomes the problems found in the prior art.

Another feature of the present invention is the provision of an apparatus to filter and purify water at to the consumer's point-of-use, such as, but not limited to, a tap, faucet, hydrant, spigot, spout, valve, bib, etc.

Another feature of the present invention is the provision of an apparatus to filter and purify water prior to the consumer's point-of-entry prior to the customer's point-of-use, such as, but not limited to, a tap, faucet, hydrant, spigot, spout, valve, bib, etc.

Another feature of the present invention is provision of a method to monitor a consumer's water filter/purifier usage by meter readings.

Another feature of the present invention is provision of a method to monitor a consumer's water filter/purifier usage by sensors associated with the present invention's water filter/purifier.

Another feature of the present invention is a provision of a system to use the water filter/purifier's usage monitors as the intelligence required to drive a replenishment system for the timely replacement of the consumer's water filter/purifier located near the point-of-use or point-of-entry.

Another feature of the present invention is the provision of water filter/purification replaceable cartridges that can be customized according the specific needs of a specific water system operator and/or specific end users.

Another feature of the present invention is the provision of water filter/purification replaceable cartridges that can be used in serial or parallel according to the specific needs of a specific water system operator and/or specific end users.

One or more of these and/or other objects, features or advantages of the present invention will become apparent from the following specification and claims.

SUMMARY OF THE INVENTION

The present invention relates generally to the end-to-end control of water quality in a water purification and distribution system to a consumer at point-of-use, at the point-of-entry prior to the point-of-use, near the point-of-entry prior to the point-of-use, etc. More specifically the present invention is a system, method, and apparatus to achieve water quality through the controlled distribution of water filtration and purification products in order to reduce liability of the water system operator, which may be public or private, profit or non-profit, while increasing the overall purity of the water at the end consumer's point-of-use, at the point-of-entry, prior to the point-of-use, near the point-of-entry prior to the point-of-use, etc., of a building, which may a single tenant dwelling, a multiple unit tenant dwelling, a single tenant commercial, industrial, retail, manufacturing building, etc., or a multiple tenant commercial, industrial, retail, manufacturing, warehousing building, etc., which has the ultimate goal of increasing the health of the consumer.

The present invention enables the water utility to control end to end water quality by using an integral fixture or extension of the existing distribution piping infrastructure. The present invention also enables all customers of all municipalities throughout the world to use this Drinking Water System (DWS). The DWS will solve water delivery infrastructure problems from the treatment plant through the distribution piping to the tap.

Customers will benefit from the present invention because either the DWS was mandated by the water utility, public utility commission (PUC), EPA, Homeland Security, health department, foreign trade zones, water department or any other local, municipal, county, state, or federal agency in the USA or abroad (i.e. US embassies, US military bases, US protectorates, US territories, commissioned, decommissioned, or stricken US government ships, US government airplanes, etc), or private entity of any country, or the customer, at their option, chose to receive the DWS.

The DWS can be a variety of types, including, but not limited to, a countertop or under counter, a filter or purifier (bacteria/viral removal/kill), single or multiple cartridges or modular design. The DWS can be provided with little or no capital outlay by the utility.

As an example, a private company using the present invention and working with the water utility, would build and private label drinking water systems designed to eliminate contaminants specified by the water utility, deliver the systems from their own fulfillment centers, track time for replacement cartridges, and deliver them to their customer's door. In addition the private company would also supply a "check the box" mailer for the first notification to the customer and an informational mailer for the second notification, both to be included with the utility's billing statement. There would be little or no capital outlay by the public/private water utility and no hidden marketing or administrative costs.

The water utility, for its part, would provide the customer base, the contaminants that needed to be removed, and provide public service announcements via TV, newspapers, internet, radio, mailers, etc. The water utility would also include a "check the box" mailer or informational mailer in their monthly billing envelope. The announcements would give their customers the option to sign up for the program and "check the box". The water utility would also collect the money as part of their normal billing/collection process and pay the private company for their efforts.

When a replacement cartridge is necessary, the customer would pay a fee which would be added to the customer's water bill by the utility. The fee is designed to cover the private company's associated costs for providing the DWS and replacement filters to the customer.

The water utilities receive a great financial return for their efforts with no capital outlay. In addition to additional profits, water utilities can delay large distribution infrastructure expenditures, without compromising the quality of water being delivered to customers, and amortize these huge infrastructure costs over many more years, because of the present invention. In fact, the present invention will enable the utility to not only maintain but actually increase the quality of the water the customer drinks.

Even consumer advocates will find any rate hikes necessary a win-win for the consumers and the environment. Water utilities and consumer advocates will work together for the first time because the present invention is consumer-oriented, consumer-friendly, cost efficient, and environmentally sound.

In addition, to the marketing method outlined above, the present invention could be mandated by the federal, state, or local government. The present invention could be undertaken by a water utility as give away program to the end user or consumer to overcome any perceived liability that may be inherent in operating a water distribution system that is substandard and introduces contaminants beyond the point of distribution on a water treatment plant. This give away program could be implemented throughout the system, or in specific areas or buildings where the water system is under the greatest duress. The present invention could be promoted by a water utility as a pilot program with free units to a portion of their end consumers in order to build interest in a more widespread implementation throughout their customer base.

The present invention is an effective environmental solution to help rid any country of the plastic bottles that drinking water comes in from polluting our world.

Currently the lead problem in the eastern US, and the arsenic in the western parts of the US that has not been addressed, can now be resolved at no cost to the utility.

In addition to filtration, the present invention will provide the first EPA approved bacterial/viral point of use drinking water system to be used by FEMA and Homeland Security for disasters such as hurricanes, floods, or for other Homeland Security issues caused by terrorists. An easy replacement purification cartridge would be used to replace the filtration cartridge when deemed necessary by the government.

Water issues caused by disasters such as hurricane Katrina could be minimized once the water department's equipment is operational using the present invention, thus decreasing the need for bottled water and then have to dispose of the bottles.

The present invention is the only way to maintain the quality and guarantee the safe delivery of the water from the utility's water treatment plant to the customer's tap. The present invention assures that the water, at the customer's tap (point of use), meets EPA/governmental/state regulations from treatment plant to the tap. The present invention provides both filtration and purification technologies as needed by the utility to handle any problem including bacterial/viral removal/kill.

A partnership with a private company and the water utility would allow the end user, to control their drinking water destiny and to eliminate or significantly decrease the unregulated bottled water industry.

The inventors envision us as part of a water utility's acquisition team, helping the utility when they acquire new water utilities by alleviating their contaminant problems on a case-by-case basis. Cartridges would be supplied for the utility on a case-by-case contaminant basis for each of their utilities.

Water utilities do a superb job at the water treatment plant complying with all EPA standards. However, once the water leaves the plant, the infrastructure delivery system (which, nationwide, needs a tremendous amount of work estimated at 1-3 trillion dollars) and a customer's lead pipes, brass fixtures, etc., in their homes, create contaminant problems at the tap. Water tested at the customer's tap tells a totally different story than when tested at the treatment facility. That's why 60% of Americans drink bottled water (at a cost of approximately $600-$800 annually per household of four). By using the present invention, every household in America can regain their confidence in their local water utility and drink tap water (rather than the unregulated, costly, environmentally unfriendly bottles that are being aggressively marketed in the USA and abroad).

The present invention is inclusive of working towards EPA regulation of point-of-use, at the point-of-entry prior to the point-of-use, near the point-of-entry prior to the point-of-use, etc. filtration and purification (with bacterial/viral removal/kill), FEMA disaster and Homeland Security issues.

The present invention extends the control of a water system operator from the meter to the consumer's point of use, such as, but not limited to a tap, faucet, hydrant, spigot, spout, valve, bib, etc., by providing a water filter/purifier designed to improve the overall quality of the water through the purification of disinfectants such as, but not limited to chlorine added by a water system operator, and the filtration of contaminants, such as, but not limited to lead from lead pipes, to increase the health of the consumers they serve while reducing their overall liability, and concurrently providing a measure of protection against terrorist attacks on water supply systems.

The present invention's end-to-end control of water quality in a water purification and distribution system to a consumer at point-of-use, such as, but not limited to a tap, faucet, hydrant, spigot, spout, valve, bib, etc., and more specifically to a system, method, and apparatus to achieve water quality through the controlled distribution of water filtration and purification products in order to reduce liability of the water system operator, which may be public or private, profit or non-profit, while increasing the overall purity of the water at the consumer's point-of-use, such as, but not limited to a tap, faucet, hydrant, spigot, spout, valve, bib, etc., which has the ultimate goal of increasing the health of the consumer, and overcoming the enormous costs associated with replacing the nation's aging water distribution system infrastructure, with the added benefit of ensuring that filtered and purified water is available to the consumer at their point-of-use even on the consumer's side of the water meter demarcation point.

Through the use of intelligence gained from water meter readings and/or sensors, previously referred to as tattletales, on the consumer's water filter/purifier located near the point-of-use, at the point-of-entry prior to the point-of-use, near the point-of-entry prior to the point-of-use, etc., a replenishment system is provided with key data to drive the necessary business processes to order, package, and ship replacement consumer water filter/purifiers.

Additionally, quality control measures may be instituted to ensure the replacement filter/purifier cartridge has been installed, which may include the return of the used water filter/purifier, or the automatic closing of a valve in the water filtration and purification unit due to feedback from internal meter readings and monitors, or feedback from an external source, such as, but not limited to a signal from the water system operator's database.

According to one aspect of the invention, a method of providing end-to-end water quality control from a water system operator to a point of delivery proximate a consumer is provided. The method includes treating the water, delivering the water to the point of delivery, purifying the water at the point of delivery, monitoring water quality at the point of delivery, and reporting water quality at the point of delivery to the water system operator over a network. The step of purifying the water is preferably performed using a water filter/purifier cartridge. Also, water usage of the consumer may be monitored and the water usage may be reported to the water system operator over the network. Where a water filter/purifier cartridge is used, an estimate of when the cartridge needs replaced may be made. Thus, a replacement cartridge may be sent to the consumer prior to when the cartridge needs replacement.

According to another aspect of the invention a method of providing end-to-end water quality control from a water system operator to a point of delivery proximate a consumer is provided. The method includes treating the water, delivering the water to the consumer at the point of delivery, purifying the water at the point of delivery, monitoring water quality at the point of delivery, reporting water quality at the point of delivery to the water system operator over a network, stopping supply of the water at the point of delivery if the water quality is below a threshold, and providing a promise from the water system operator to the consumer that the water quality is above the threshold. The method may further include billing the consumer for products or services associated with water delivery, including delivery of the water itself, monitoring of water quality, or replacement filter/purification cartridges. The water quality can be determined in a number of different in ways, including based on concentration levels of contaminants within the water. The present invention also preferably provides for stopping supply of the water to a water fixture at the point of delivery if the water quality at the point of delivery is below a threshold.

The method of the present invention is unique in several ways. First, the present invention is designed to provide the very best drinking water that meets or exceeds the same EPA standards for water leaving a water treatment plant, at a specific consumer's point-of-use, at the point-of-entry prior to the point-of-use, near the point-of-entry prior to the point-of-use, etc. The only way to continuously ensure that drinking quality water delivered to a consumer's point-of-use meets or exceeds the same EPA standards for drinking water that has been distributed through the aging infrastructure of uncertain integrity of the water system operator and the in-building infrastructure beyond the water meter demarcation point is to filter and purify the water again at the consumer's point-of-use, at the point-of-entry prior to the point-of-use, near the point-of-entry prior to the point-of-use, etc. It has been estimated that nationwide in the United States it would cost 1-3 trillion dollars to upgrade water system operator's distribution system, which does not include the upgrade of consumer's in-building water pipes and fixtures. The present invention is a "last inch technology" that is intended to ensure the very best drinking water that meets or exceeds the same EPA standards for water leaving a water treatment plant is available at a specific consumer's point-of-use, at the point-of-entry prior to the point-of-use, near the point-of-entry prior to the point-of-use, etc., not just at the water meter demarcation point. In a post 9-11 world it is incumbent upon Federal and State government agencies, including, environmental, emergency management, and homeland security, to regulate water quality all the way to consumer's point-of-use, at the point-of-entry prior to the point-of-use, near the point-of-entry prior to the point-of-use, etc. for all forms of contaminants, not just lead, copper, and coliforms. Furthermore, it is incumbent upon Federal and State governments to monitor water quality more frequently and more widespread and more frequently than mandated by the EPA, particularly in the post 9-11 world. The present invention would allow continuous monitoring, filtration and purification of water at the consumer's point-of-use, at the point-of-entry prior to the point-of-use, near the point-of-entry prior to the point-of-use, etc.

Second, the present invention overcomes the unregulated bottled water industry, which uses costly, environmentally unfriendly bottles that go into the nation's landfills. Consumers believe the water they are drinking from bottles is filtered and purified to EPA standards, but in fact this industry is unregulated and a health concern to consumers.

Third, the present invention's replaceable filter/purifier cartridges can be customized to meet the various specific needs of the end user or consumer connected to a water system operator's system. It should be noted that as the raw source for a water treatment plant changes over time, the replaceable filter/purifier cartridges can be tuned to meet the changing conditions related to water quality, as well as the specific local conditions of a specific end user or consumer within a water distribution system. As an example, an older part of town may still have lead distribution pipes, which would require a different kind of filter/purifier than the newer part of a community that has been plumbed using plastic pipes. As another example, arsenic may not have been present in the raw water supply last year, but today it is, therefore, the tunable, replaceable filter/purifier cartridges provide a consistent end-to-end water system quality over time without a need to re-engineer the entire system from the plant through the distribution network to the end consumer's distribution system to their tap. The water can be monitored throughout the system, and water filter/purifier cartridges can be tuned and replaced as needed to provide the end user or consumer the highest quality water that ensures their health, the health of their family, and the safeguard the nation needs to keeps it citizens and workforce healthy in the age of terrorism, and the declining availability of dollars to rebuild the water system infrastructure over the short-term.

Fourth, the present invention is unique as it will not cost anything for water system operators or the Federal and State Government agencies to implement, yet they will be able to ensure their customers and constituents will be receiving EPA quality water all the way to the consumer's point-of-use. The present invention provides the water filter/purifier, water filter/purifier replacement cartridges customized for the specific needs of consumers in specific water system operators, fulfillment centers, and mailers. The water system operator would add a new line item to their monthly billing statement, charge the consumer a nominal cost, collect the revenue, and distribute the revenue accordingly, while reducing their liability, providing widespread, near real-time monitoring of water quality, and going the last inch to filter and purify water to EPA standards for water quality at the plant.

A more complete understanding of the system, method, and apparatus for the end-to-end control of water system quality through the controlled distribution of water filtration and purification products will be afforded to those skilled in the art, as well as a realization of the additional features and advantages thereof, by a consideration of the following detailed description of the preferred embodiment. Reference will be made to the appended drawings which will first be described briefly.

BRIEF DESCRIPTION OF THE DRAWINGS

FIG. 5 is an information flow diagram according to one embodiment of the present invention.

DETAILED DESCRIPTION OF AN EXEMPLARY EMBODIMENT

Figure 1A:
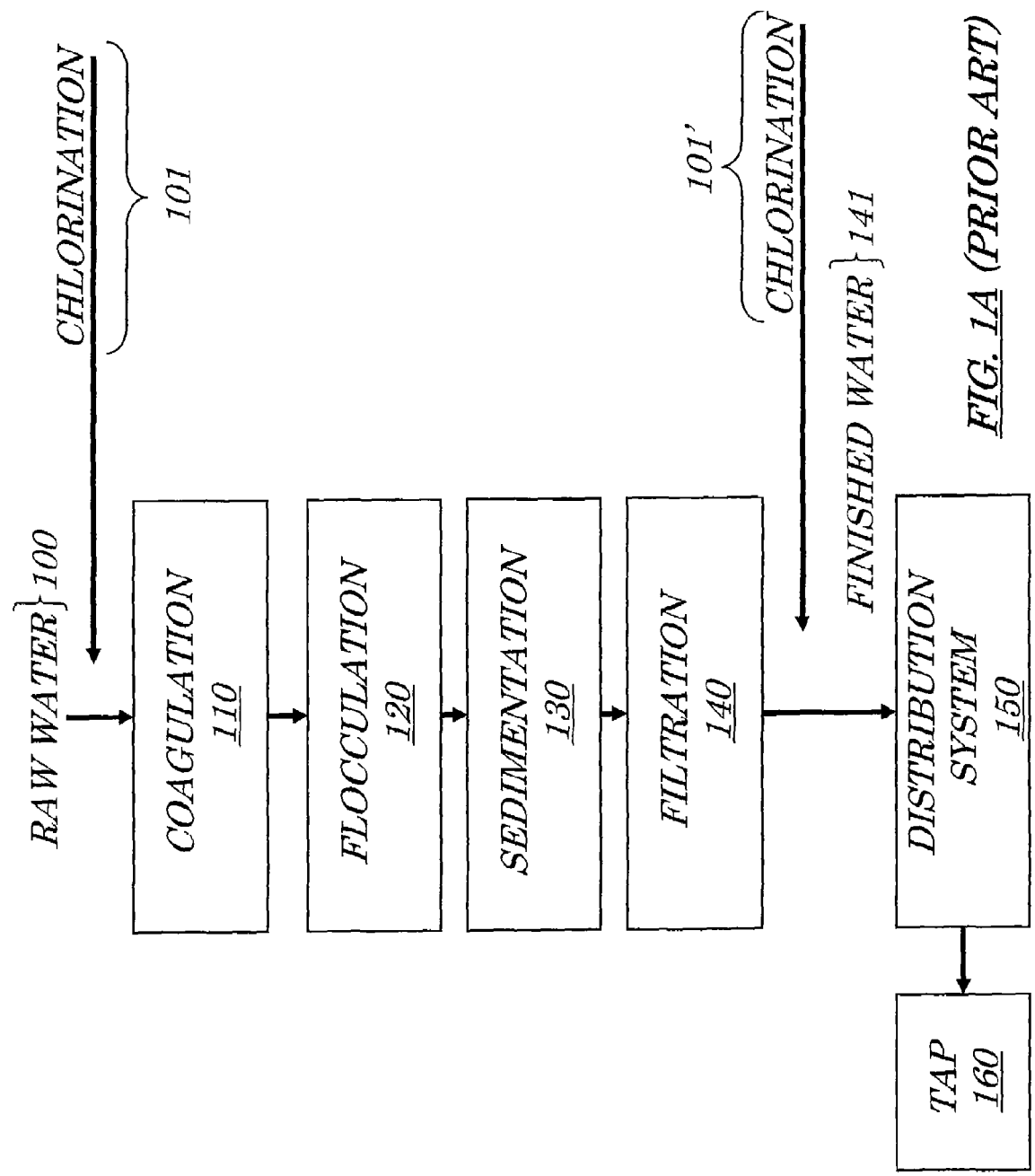
FIG. 1A is a pictorial representation of uncontrolled end-to-end water purification and distribution system without a consumer controlled water filter/purifier.

The present invention relates generally to the end-to-end control of water quality in a water purification and distribution system to a consumer at point-of-use, such as, but not limited to a tap, faucet, hydrant, spigot, spout, valve, bib, etc., and more specifically to a system, method, and apparatus to achieve water quality through the controlled distribution of water filtration and purification products in order to reduce liability of the water system operator, which may be public or private, profit or non-profit, while increasing the overall purity of the water at the consumer's point-of-use, such as, but not limited to a tap, faucet, hydrant, spigot, spout, valve, bib, etc., which has the ultimate goal of increasing the health of the consumer.

One option of the present invention is the provision of a sensor to report the contamination of the public drinking water supply that may have occurred beyond the physical boundaries of a water treatment facility. This contamination may occur by the unintentional introduction of biological, chemical or radiological agents. Also, in the post 9/11 world this contamination may be intentional. The present invention's filter/purifier can optionally include sensors to monitor the presence of undesirable biological, chemical or radiological agents that are capable of communicating with the appropriate government agencies, health agencies, and the appropriate public water supply operator.

The present invention extends the control of a water system operator from the meter to the consumer's point-of-use, such as, but not limited to a tap, faucet, hydrant, spigot, spout, valve, bib, etc., by providing a water filter/purifier designed be placed near the consumer's point-of-use, at the point-of-entry prior to the point-of-use, near the point-of-entry prior to the point-of-use, etc. in order to control and improve the overall quality of the water and increase the health of the consumers they serve while reducing their overall liability, and concurrently providing a measure of protection against terrorist attacks on water supply systems.

Through the use of intelligence gained from water meter readings and/or sensors on water filter/purifiers located near the consumer's point-of-use, at the point-of-entry prior to the point-of-use, near the point-of-entry prior to the point-of-use, etc. a replenishment system can be provided with key data to drive the necessary business processes to order, package, and ship replacement water filter/purifiers for water filter/purifier units controlled by the water system operator and located near the consumer's point-of-use, such as, but not limited to a tap, faucet, hydrant, spigot, spout, valve, bib, etc., for installation by the consumer.

Additionally, quality control measures may be instituted to ensure the replacement filter/purifier cartridge has been installed, which may include the return of the used water filter/purifier, or the automatic closing of a valve in the water filtration and purification unit due to feedback from internal meter and monitors, or feedback from an external source, such as, but not limited to a signal from the water system operator's database.

Acronyms & Abbreviations
  CWS: Community Water System
  GPRA: Government Performance and Results Act—Program Measures
  M/R: Monitoring/Reporting Violation [water system's failure to monitor for, or report to the state, the level of a contaminant on the required schedule]
  MCL: Maximum Contaminant Level [the legal limit of a contaminant in drinking water]
  MRDL: Maximum Residual Disinfectant Level [for disinfectants added to drinking water]
  NTNCWS: Non-Transient Non-Community Water System
  PWS: Public Water System
  PWSS: Public Water System Supervision Program
  TNCWS: Transient Non-Community Water System
  TT: Treatment Technique [a drinking water treatment required by EPA or state rules]

FIG. 1A is a pictorial representation of uncontrolled end-to-end water purification and distribution system without a consumer controlled water filter/purifier. Raw water 100 is sourced from either surface water or ground water. Typically raw water 100 coming into a water purification plant is disinfected by a chlorination 101 process. Water is disinfected but never completely sterilized in the water treatment process. This disinfection is a two part process that typically includes: 1) removal of particulate matter by filtration, and 2) inactivation of pathogenic microorganisms by chlorine, chlorine dioxide, ozone, or other disinfectants. Varying degrees of disinfection can be attained by altering the type and concentration of disinfectant, as well as the time water is in contact with the disinfectant.

The next steps of water purification are coagulation 110 and flocculation 120. The coagulation 110 process adds chemicals known as coagulants, such as aluminum sulfate, or alum. In water, alum forms sticky globs, commonly called flocs that attach themselves to bacteria and other impurities. The water that has been coagulated is pumped into a settling basin where the flocs and associated contaminants sink to the bottom. This process is known as sedimentation 130. These steps of water purification remove most of the impurities from the incoming raw water 100.

As an example, water being treated is then pumped through a filtration process 140, which may consist of a 2½ foot bed of sand on top of a 1 foot bed of gravel. Sometimes a layer of anthracite (coarse black coal) and/or garnet may be added to the filter bed. The different materials act like a giant strainer and trap the particles the sedimentation process doesn't capture.

After the filtration process 140, the water flowing through the water purification plant undergoes an additional chlorination 101' process. The chlorinated water flows into what is known as the clearwell, which is the first point in the process of purifying water in which it is in a potable (drinkable condition). The finished water 141 is sampled from the clearwell before it is released into the distribution system 150.

The distribution system 150 consists of pipes, pumps, reservoirs, and elevated tanks. Prior to entering a consumer's premise the water flows through a meter to measure the amount of water an individual or business uses on a periodic basis. The meter reading is the basis for charging a consumer an amount based on their actual usage.

The dashed line in FIG. 1A is meant to graphically represent the area of control a water system operator has, which is to the water meter at the end of their distribution system 150. Water system operators do not filter processed drinking water between their distribution system 150 and the consumer's tap 160. Other points-of-use include but are not limited to a faucet, hydrant, spigot, spout, valve, bib, etc.

In this scenario, the liability for end-to-end water quality has not been assumed by the water system operator, which may be public or private, profit or non-profit. Also, in this scenario there is no provision for an apparatus near the consumer's tap 160 to monitor the overall quality of the water nearest the consumer's tap 160.

Figure 1B:
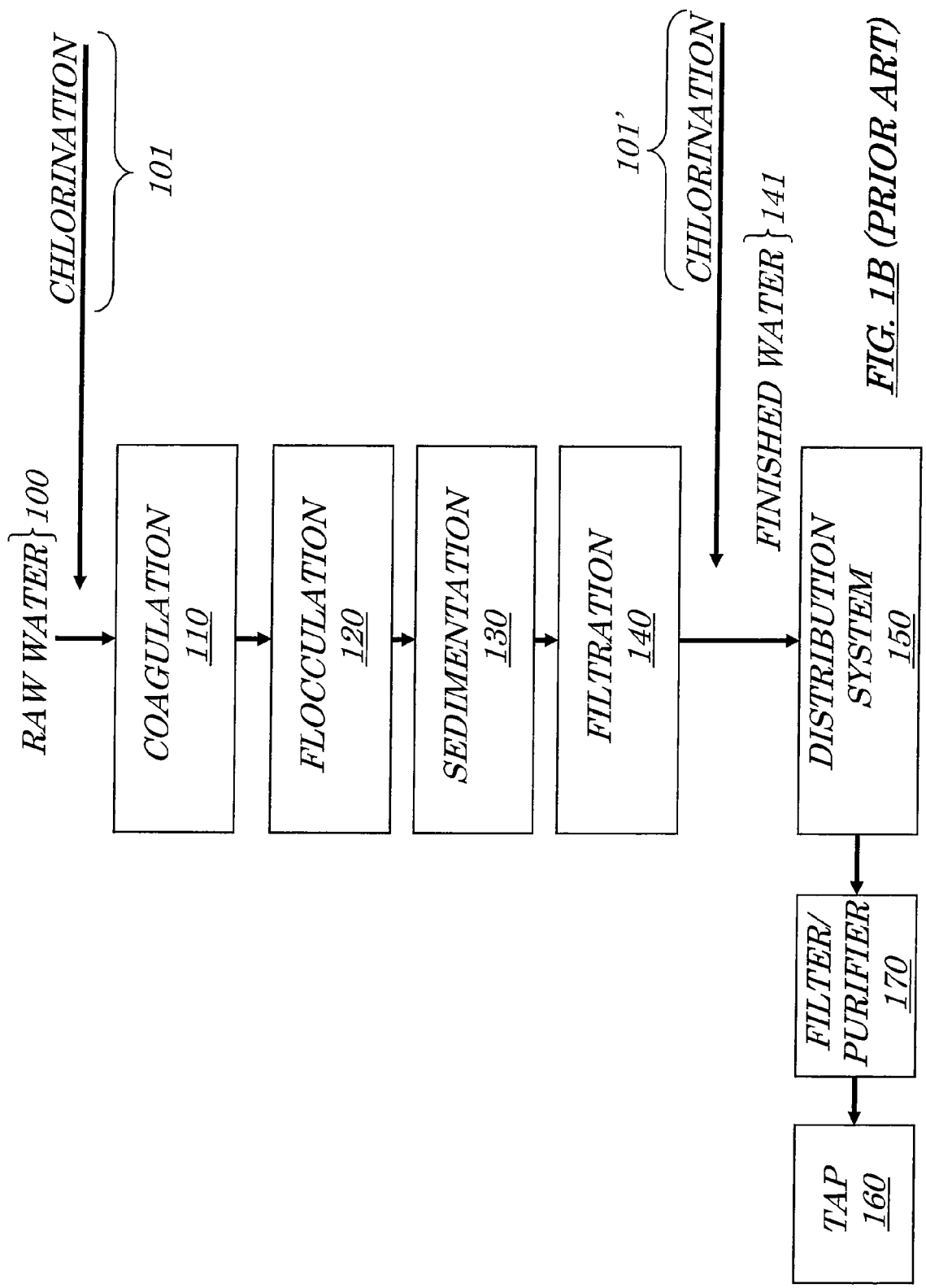
FIG. 1B is a pictorial representation of uncontrolled end-to-end water purification and distribution system with a consumer controlled water filter/purifier near the point-of-use, at the point-of-entry prior to the point-of-use, near the point-of-entry prior to the point-of-use, etc.

FIG. 1B is a pictorial representation of uncontrolled end-to-end water purification and distribution system that includes a consumer controlled water filter/purifier. Raw water 100 is sourced from either surface water or ground water. Typically raw water 100 coming into a water purification plant is disinfected by a chlorination 101 process. Water is disinfected but never completely sterilized in the water treatment process. This disinfection is a two part process that typically includes: 1) removal of particulate matter by filtration, and 2) inactivation of pathogenic microorganisms by chlorine, chlorine dioxide, ozone, or other disinfectants. Varying degrees of disinfection can be attained by altering the type and concentration of disinfectant, as well as the time water is in contact with the disinfectant.

The next steps of water purification are coagulation 110 and flocculation 120. The coagulation 110 process adds chemicals known as coagulants, such as aluminum sulfate, or alum. In water, alum forms sticky globs, commonly called flocs, which attach themselves to bacteria and other impurities. The water that has been coagulated is pumped into a settling basin where the flocs and associated contaminants sink to the bottom; this process is known as sedimentation 130. These steps of water purification remove most of the impurities from the incoming raw water 100.

As an example, water being treated is then pumped through a filtration process 140, which may consist of a 2½ foot bed of sand on top of a 1 foot bed of gravel. Sometimes a layer of anthracite (coarse black coal) and/or garnet may be added to the filtration bed. The different materials act like a giant strainer and trap the particles the sedimentation process doesn't capture.

After the filtration process 140, the water flowing through the water purification plant undergoes an additional chlorination 101') process. The chlorinated water flows into what is known as the clearwell, which is the first point in the process of purifying water in which it is in a potable (drinkable condition). The finished water 141 is sampled from the clearwell before it is released into the distribution system 150.

The distribution system 150 consists of pipes, pumps, reservoirs, and elevated tanks. Prior to entering a consumer's premise the water flows through a meter to measure the amount of water an individual or business uses on a periodic basis. The meter reading is the basis for charging a consumer an amount based on their actual usage.

The dashed line in FIG. 1B is meant to graphically represent the area of control a water system operator has, which is to the water meter at the end of their distribution system 150. Water system operators do not filter processed drinking water between their distribution system 150 and the consumer's tap 160. Other points-of-use include but are not limited to a faucet, hydrant, spigot, spout, valve, bib, etc.

In FIG. 1B the consumer has made a decision to install a filter/purifier 170 to improve the quality of the finished water 141 they receive from their water system operator via their connection to a water meter at the end of the distribution system 150.

In this scenario, the liability for end-to-end water quality has not been assumed by the water system operator, which may be public or private, profit or non-profit. Also, in this scenario there is no provision for an apparatus near the consumer's tap 160 to monitor the overall quality of their water.

Figure 2:
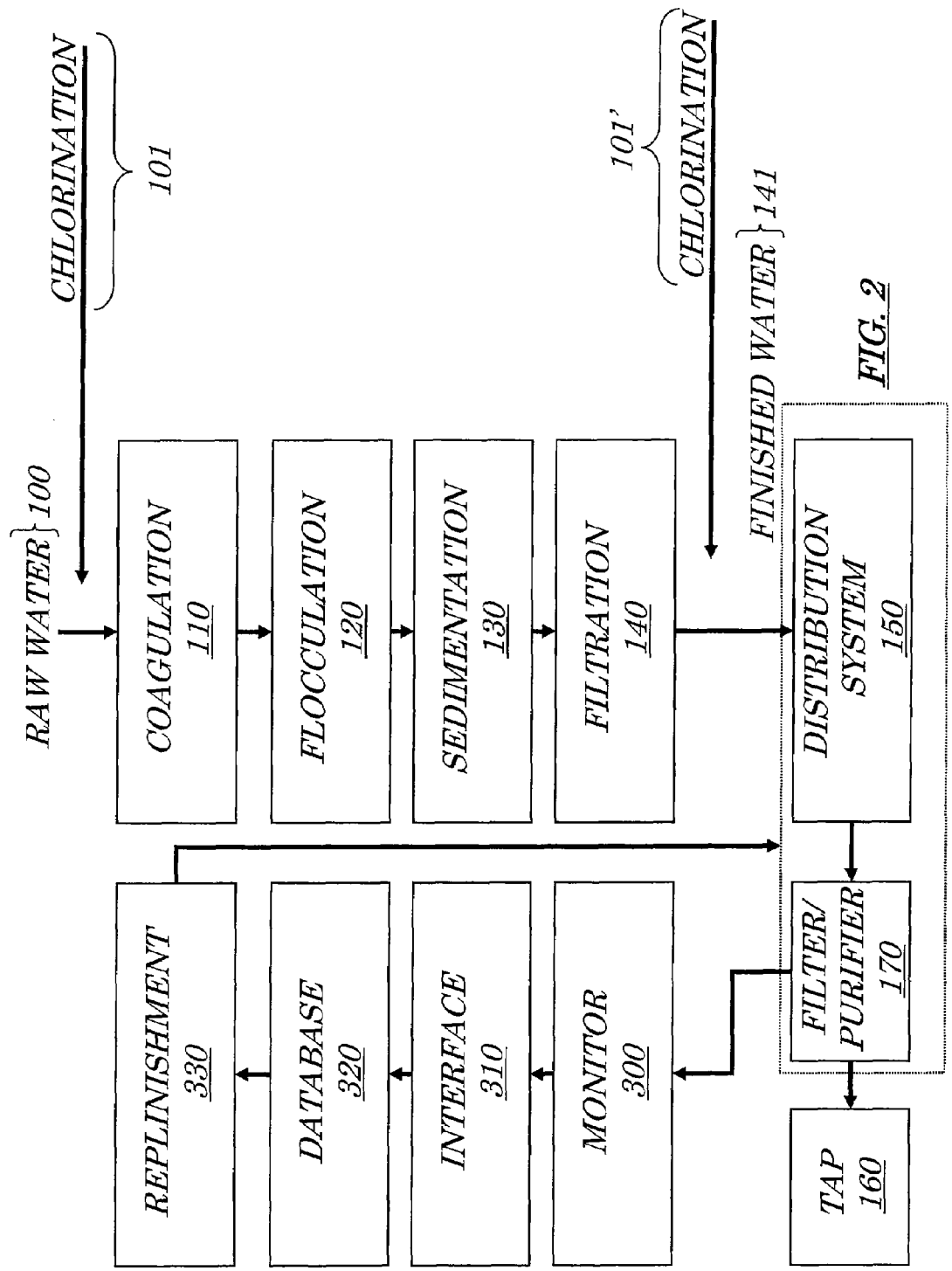
FIG. 2 is a pictorial representation of the preferred embodiment of the present invention, which is a water system operator controlled end-to-end water purification and distribution system, including a water system operator controlled water filter/purifier located near the consumer's point-of-use, at the point-of-entry prior to the point-of-use, near the point-of-entry prior to the point-of-use, etc., and a system to monitor water filter/purifier usage in order to intelligently replenish the consumer's water filter/purifier located near the point-of-use, at the point-of-entry prior to the point-of-use, near the point-of-entry prior to the point-of-use, etc.

FIG. 2 is a pictorial representation of the preferred embodiment of the present invention, which is a controlled end-to-end water purification and distribution system, including a water system operator controlled water filter/purifier located near the consumer's point-of-use, such as, but not limited to a tap, faucet, hydrant, spigot, spout, valve, bib, etc., and a system to monitor water usage in order to intelligently replenish the water system operator's controlled water filter/purifier located near the consumer's point-of-use, at the point-of-entry prior to the point-of-use, near the point-of-entry prior to the point-of-use, etc.

FIG. 2 is a pictorial representation of controlled end-to-end water purification and distribution system that includes a water system operator controlled water filter/purifier. Raw water 100 is sourced from either surface water or ground water. Typically raw water 100 coming into a water purification plant is disinfected by a chlorination 101 process. Water is disinfected but never completely sterilized in the water treatment process. This disinfection is a two part process that typically includes: 1) removal of particulate matter by filtration, and 2) inactivation of pathogenic microorganisms by chlorine, chlorine dioxide, ozone, or other disinfectants. Varying degrees of disinfection can be attained by altering the type and concentration of disinfectant, as well as the time water is in contact with the disinfectant.

The next steps of water purification are coagulation 110 and flocculation 120. The coagulation 110 process adds chemicals known as coagulants, such as aluminum sulfate, or alum. In water, alum forms sticky globs, commonly called flocs, which attach themselves to bacteria and other impurities. The water that has been coagulated is pumped into a settling basin where the floes and associated contaminants sink to the bottom; this process is known as sedimentation 130. These steps of water purification remove most of the impurities from the incoming raw water 100.

As an example, water being treated is then pumped through a filtration process 140, which may consist of a 2½ foot bed of sand on top of a 1 foot bed of gravel. Sometimes a layer of anthracite (coarse black coal) and/or garnet may be added to the filtration bed. The different materials act like a giant strainer and trap the particles the sedimentation process doesn't capture.

After the filtration process 140, the water flowing through the water purification plant undergoes an additional chlorination 101' process. The chlorinated water flows into what is known as the clearwell, which is the first point in the process of purifying water in which it is in a potable (drinkable condition). The finished water 141 is sampled from the clearwell before it is released into the distribution system 150.

The distribution system 150 consists of pipes, pumps, reservoirs, and elevated tanks. Prior to entering a consumer's premise the water flows through a meter to measure the amount of water an individual or business uses on a periodic basis. The meter reading is the basis for charging a consumer an amount based on their actual usage.

The dashed line in FIG. 2 is meant to graphically represent the area of control a water system operator has, which is the consumer's point-of-use, tap 160, other points-of-use include, but are not limited to a faucet, hydrant, spigot, spout, valve, bib, etc., connected to the water system operator's distribution system 150.

In FIG. 2 the water system operator, which may be public or private, profit or non-profit, has made a decision to install a filter/purifier 170 near the consumer's point-of-use, at the point-of-entry prior to the point-of-use, near the point-of-entry prior to the point-of-use, etc., including but not limited to a tap, faucet, hydrant, spigot, spout, valve, bib, etc., to improve the quality of the processed water 141 to the consumer they flow through their distribution system 150.

In this scenario, the liability for end-to-end water quality from the raw water 100 to the consumer's tap 160 has been assumed by the water system operator, which may be public or private, profit or non-profit.

Figure 4:
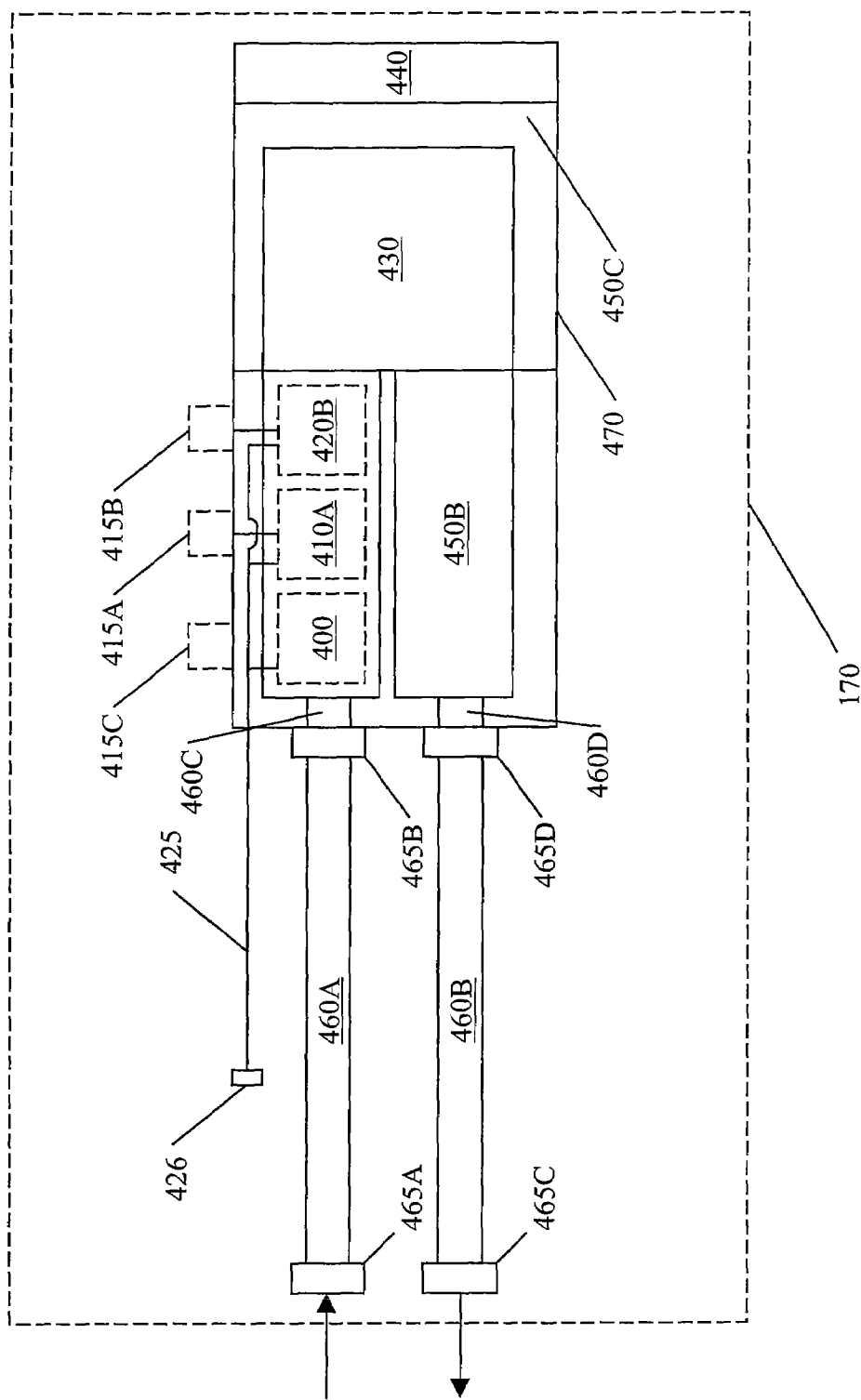
FIG. 4 is an illustration of the preferred water filter/purifier for use with the present invention.

The preferred water filter/purifier 170 for use in this end-to-end water quality control system is shown in FIG. 4, although, any water filter/purifier can be used in conjunction with the present invention to control the filtration and purification of water near the consumer's point-of-use, at the point-of-entry prior to the point-of-use, near the point-of-entry prior to the point-of-use, etc.

One feature of the present invention's preferred Almega™ water filter/purifier 170 is the provision of water filter/purification replaceable cartridges that can be customized according the specific filtration and purifications needs of a specific water system operator and/or specific end users.

In FIG. 2 a monitor process 300 using data collected from the water meter connected to the end of a water system operator's distribution system is the primary source of feedback regarding the probable status of water filter/purifier 170. Alternatively, or in conjunction with a water meter reading, or a sensor on water filter/purifier 170 can be used to indicate whether the meter is still operating within its intended parameters of safety. The feedback gathered in monitor process 300 is reported via an interface 310 into a database 320. On a simple level, the water system operator may choose to use their periodic meter readings to monitor the amount of water flow that water filter/purifier 170 would experience. Knowing a particular consumer's water consumption habits in conjunction with meter readings would enable a highly educated estimate to be made as to the proper time to send a replacement water filter/purifier cartridge for water filter/purifier 170 to a consumer. In addition to estimating the time at which to send a replacement water filter/purifier cartridge for water filter/purifier 170, the water filter/purifier can also include a sensor that provides a visual indication that would provide a consumer an indication that the water filter/purifier cartridge for water filter/purifier 170 was in need of replacement. Additionally, water filter/purifier 170 can include a sensor that is connected to a communication interface device and provide an electronic signal that is an indication that the water filter/purifier cartridge for water filter/purifier 170 was in need of replacement.

Interface 310 which is used to report feedback gathered in monitor process 300 to database 320 may be controlled by either the water system operator, or may be in the hands of the consumer. Examples of interface 310 which is controlled by a water system operator may include manual input from a computer keyboard, data collected in the form of a barcode from a barcode scanner, data collected from the download of a meter reader's collection device into a computer system, etc. In addition, a water system operator controlled interface may include the transmission and receipt of a signal from a sensor integrated into water filter/purifier 170 indicating that water filter/purifier 170 is nearing the end of its safe operational life. Presumably, this signal would be an electronic signal that could be sent via a wireless or hard-wired medium. At a low level, water filter/purifier 170 would make a visual signal that a consumer would understand to mean that water filter/purifier 170 was nearing the end of its safe operational life.

Examples of customer controlled interface 310 into database 320 to report self-made meter readings and/or a water filter/purifier 170 visual indication from a sensor signal, such as, but not limited to a lighted LED, include, but is not limited to the following, Internet web-pages, computer-telephone interfaces, a telephone call, completing a card and mailing it to a water system operator, etc.

Database 320 can be operated by the water system operator, or by a third party on behalf of a water system operator. Database 320 is capable of being programmed to predict water filter/purifier cartridge life based on actual meter readings and/or estimated usage and/or a water filter/purifier 170 sensor signal.

Database 320 is capable of generating output to a replenishment system. The replenishment system would be capable of issuing an order to manufacture, or pull from inventory a replacement water filter/purifier cartridge, and route a replacement filter/purifier cartridge through shipping to a consumer. A quality control system may be instituted by a water system operator to ensure that the replacement cartridge for water filter/purifier 170 has been installed by requiring the used filter/purifier cartridge for water filter/purifier 170 be returned. In order to assist this process, a unique alpha-number, alpha, or numeric identifier on a water filter/purifier cartridge can be used to link a specific water filter/purifier 170 to a specific consumer connected to the water system operator's distribution system 150.

Database 320 is capable of storing the appropriate records for water filter/purifier 170 cartridges that have been customized for the specific water filtration and purification needs of a specific water system operator and/or end user.

Figure 3:
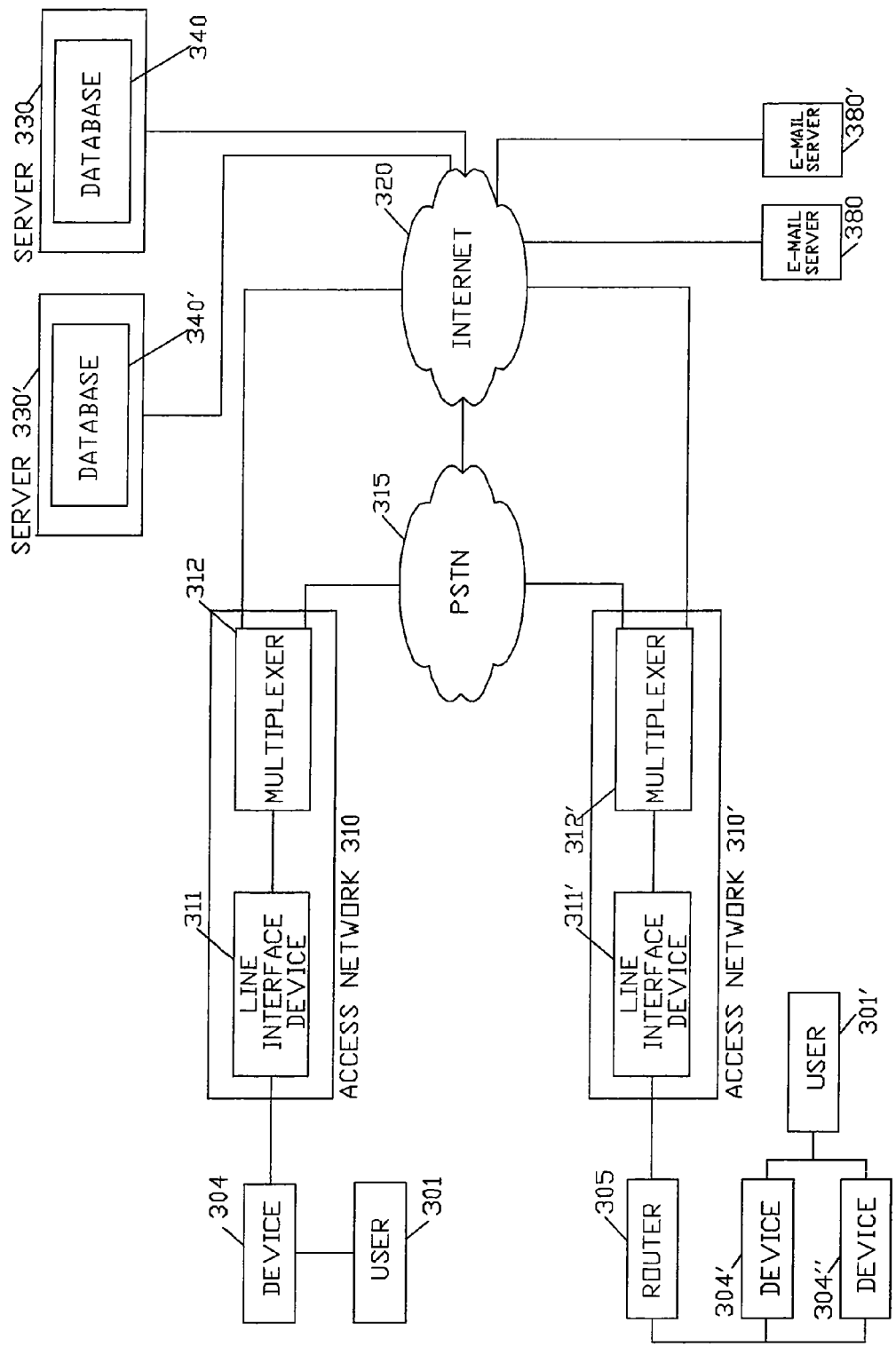
FIG. 3 illustrates the general topography of the data collection and communication system of preferred embodiment of the present invention.

FIG. 3 illustrates the general topography of the data collection and communication system of preferred embodiment of the present invention. The present invention provides servers 330, 330' which contain databases 340 and 340' respectively. Databases 340, 340' are used to store information related to a water filter/purifier including the demographic information of the consumer. This demographic information stored on databases 340, 340' can be used to drive a messaging system.

Databases 340, 340' are accessible via the Internet 320. Servers 330, 330' can be a collection of one or more servers, computers, etc. that are able to provide functionality for the present invention. Servers 330, 330' can include multiple similar and distinct hardware components or models, such as but not limited to Dell, IBM, Sun, HP and required operating system software such as but not limited to UNIX, Microsoft Windows, Redhat Linux and other required supportive operating systems. In addition, servers 330, 330' can include a multitude of supporting software components required to support the implementation of the present invention including, but not limited to Apache Web Server software, Microsoft IIS Web Server Software, Oracle, MySQL, Lightweight Directory Access Protocol (LDAP), Domain Name System (DNS) and HyperText Transfer Protocol (HTTP), Voice recognition software, Voice application engines, Application engines, and CORBA software and middleware. Databases 340, 340' represents the storage of data including software required to run servers 330, 330' and provide functionality for the present invention. Databases 340, 340' can be attached to server 330, 330' via network transport or bus connections including, but not limited to Small Computer Systems Interface (SCSI), Internet SCSI (iSCSI), Peripheral Component Interconnect (PCI), Fiber optic transport, Fiber Channel, TCP/IP, and SNA. In addition, databases 340, 340' can be a collection of one or more media storage units that are located locally or remotely to servers 330, 330'. Databases 340, 340' can be built on storage such as, but not limited to, magnetic and optical media. These systems and associated software may be housed in an Internet Data Center equipped with fully redundant subsystems, such as multiple fiber trunks coming from multiple sources, redundant power supplies, and backup power generators. Databases 340, 340' may also utilize firewall technology to securely protect the information stored in databases 340, 340'. In addition, database 340, 340' may provide secure access through the use of passwords, Personal Identification Numbers (PIN), and/or biometric identification. Such systems are commonly used in applications such as those described in the preferred embodiment of the present invention.

FIG. 3 shows consumer 301 connected to database 340, 340' via access networks 310. Access Networks 310 may be configured as Cable TV or PSTN, and can be used for accessing information stored in databases 340, 340', and for messaging consumer 301 and/or devices 304, 304', 304" which are connected to one of these types of networks. Devices 304, 304', 304" may be devices such as, but not limited to, intelligent building interfaces, PCs, TVs, set-tops boxes, Internet appliances, e-mail stations, telephones, etc. Devices 304', 304" are shown connected to a router 305 which is connected to Access Network 310'. As an example, router 305 can be of the type included in a Linksys "EtherFast 10/100 Network in a Box", product number FENSK05. Water filter/purifier 170 is shown with an optional connection from a sensor on water filter/purifier 170 to device 304 which is configured as an intelligent building interface.

At a minimum, access networks 310, 310' are typically configured with a multiplexer 312, 312' and line interface device 311, 311'. The line interface device 311, 311' may be configured as a stand-alone modem, a PCMCIA card, as a wireless POP, or integrated into devices 304, 304', 304" such as, but not limited to, water filter/purifier 170 PCs, telephones, set-top boxes, etc.

The multiplexer 312, 312' may be located at the Central Office, or Digital Loop Carrier of a telephony network, or the Head-End, or intermediate node of a Cable TV network, or at a third-party Application Server Provider's office, or the network center of an auction house, etc. The multiplexer 312, 312' is capable of receiving analog and digital signals including, but not limited to, Internet traffic 320 including e-mail from e-mail servers 380, 380' and data from servers 340, 340', and voice feed from the PSTN 315, and data from servers 340, 340', etc. The multiplexed signal from multiplexer 312, 312' may be transmitted over a variety of transmission medium, including but not limited to, coaxial cable, fiber optic cable, twisted pair, plastic fiber cable, airwaves, or a combination of these.

Databases 340, 340' can be accessed by a specific user 301, 301' through the Internet 320 to add, modify, and delete data related to a consumer's water filter/purifier 170.

FIG. 4 is an illustration of the preferred water filter/purifier for use with the present invention. The water filter/purifier 170 which is preferably constructed in accordance with or certified by the NSF/ANSI Standard 42 or 53. NSF ANSI Standard 42 is entitled "Drinking Water Treatment Units—Aesthetic Effects." This standard covers point-of-use (POU) and point-of-entry (POE) systems designed to reduce specific aesthetic or non-health related contaminants (chlorine, taste and odor, and particulates) that may be present in public or private drinking water. NSF/ANSI Standard 53 is entitled "Dinking Water Treatment Units—Health Effects." This standard is directed towards point-of-use (POU) and point-of-entry (POE) systems designed to reduce specific health-related contaminants, such as *Cryptosporidium, Giardia*, lead, volatile organic chemicals (VOCs), MTBE (methyl tertiary-butyl ether), that may be present in public or private drinking water.

The water filter/purifier 170 includes at least one water quality sensor. As shown in FIG. 4, water quality sensors 400A, 400B, and 400C are present. Each water sensor can be a sensor of any number of types based in part on the particular water quality needs of a location and the characteristics of water typically supplied to that location. Water quality sensors may be used to read water for a variety of chemical and biological agents as well as clarity, rate of movement, and other physical properties or characteristics of the water. Monitored water quality factors may include pH, dissolved carbon dioxide, dissolved oxygen, biological oxygen demand (BOD), conductivity or dissolved solids, suspended solids, turbidity, or other factors. The water quality sensors may also integrate control functionality such as set limits, regulator and P/PI/PID control functions. Water quality sensors can also have simple control relay outputs. The water quality sensor may include the ability to self-calibrate, perform various self-test functions, and generate event triggers, or incorporate other types of features as may be appropriate in a particular installation.

As shown in FIG. 4, each of the water quality sensors 400A, 400B, 400C is electrically connected to an LED 410A, 410B, 410C through LED wire 405A, 405B, 405C. The LEDs 410A, 410B, 410C function as visible indicator lights to provide visual feedback to a consumer. For example, the presence of the light may indicate a positive or negative water quality, the condition of the filter/purifier, or other states of the filter/purifier.

A communication interface 426 is also shown. The communication interface 426 electrically connects the water quality sensors 400A, 400B, and 400C to a network or directly to a computing device. The present invention contemplates that the communication may be of numerous types, including a parallel network, a serial network, or other type of network device. Power wire 427 is used to provide electricity for powering the water quality sensors.

The water filter/purifier 170 includes a replacement filter/purifier cartridge 430. The replaceable filter/purifier cartridge 430 is preferably designed or selected to filter and purify water according to local conditions and needs. Filtration and purification methods include, but are not limited to, membranes, iodine, chlorine, ultra-violet radiation, iodinated resin, reverse osmosis, charcoal or carbon, and other filtration and purification methods. An expanded definition of some filtration methods are shown in Chart 1.

CHART 1

Carbon Bed—Granular Activated Carbon.
Compressed Carbon—Activated Carbon is molded, bonded or extruded to form a more solid or rigid form.
Ceramic—Candle-like shell with Activated Carbon bonded into it or Granular Activated Carbon inside.
Precoat—Very fine activated carbon bonds to the outside of a pleated fabric septum forming a tight, spongy filtering layer.
Reverse Osmosis—Spiral wound semi-permeable membrane reduces minerals and salts from the water. Usually paired with an Activated Carbon system.

An expanded definition of some purification methods are shown in Chart 2.

CHART 2

Ultra-Violet Light—Uses certain wavelengths of light to destroy bacteria and viruses. Usually paired with a fine filter to reduce cysts. Requires electricity.
Ultra-Violet Light—Uses certain wavelengths of light to destroy bacteria and viruses. Usually paired with a fine filter to reduce cysts. Requires electricity.
Iodinated Resin—When water flows through the resin, it releases Iodine to penetrate and kill bacteria and viruses. If there is enough contact time, cysts will also be killed. Systems are usually paired with a fine filter to reduce the cysts.
Membrane—An exceptionally fine, tight, sub-micron technology with the ability to reduce bacteria, viruses and cysts, along with other contaminants.
Ozone—Ozone injected into the water will reduce, bacteria and viruses. It will also kill cysts if there is enough contact time. Requires electricity. Excess ozone must be removed.
Distillation—Boils the water, causing evaporation, captures the vapors and condenses them into water. Bacteria, viruses and cysts are destroyed. Minerals and salts are also removed. Requires electricity.

These various methods may be employed alone or in various combinations. A cartridge cover 440 is positioned on the replaceable filter/purifier cartridge 430. The cartridge cover 440 may be a removable lid which includes a seal to prevent water from leaking out of the replacement filter/purifier cartridge 430. The lid is operatively connected in any number of ways such as through attachment with fasteners or the lid may form integral threads to screw into a thread on the housing 470 of the water filter/purifier 170. Disposed within the housing 470 of the filter/purifier 170 are chambers 450A, 450B, and 450C. The internal, integral chambers in the housing carry water through an optional sensor bank to the filter/purifier cartridge 430 and then out of the water filter/purifier 170 to the point-of-use.

The filter/purifier 170 also includes an input tube 460A and an output tube 460B. The input tube 460A is connected between fitting 465A and fitting 465B. There is a second input tube 460C also shown. The output tube 460B is connected between fitting 465C and fitting 465F. There is also a second output tube 460D shown.

A valve 475 is also shown. The valve regulates the flow of liquid and may be operated electronically. The valve also can act as a black flow preventer. An outflow fitting 480 is also shown. The purpose of the outflow fitting 480 is to allow water filter/purifier units to be daisy changed in order to provide a second, third, or otherwise subsequent stage of filtering in which different contaminants are removed. The outflow fitting 480 can also be used to interface options such as, but not limited, to ultraviolet purifier for microbial control or even for chlorine and chloramines removal. The outflow fitting 480 can also be used for TOC reduction and ozone removal.

FIG. 5 is a flow diagram according to one embodiment of the present invention. In FIG. 5, an end user or consumer 100 is associated with a point of delivery monitoring and/or control system 104. Information passes between the end user or consumer 100, the point of delivery monitoring and/or control system 104 and a water system operator 102. The information may be sent over a communications network of any number of types or varieties.

FIG. 5 further illustrates exemplary types of information that flow between the water system operator and the end user/consumer and/or the point of delivery monitoring/control system. For example, the water system operator 102 can send information such a command or message 110 to close a water valve. Thus, the water system operator 102 can discontinue the flow of water at the point of delivery if the water quality is determined to be unsafe. The monitor/control system 104 can send information 112 to the water system operator. The information 112 may include water usage information, replenishment information, and/or water quality information. The replenishment information can include information regarding the condition of filter/purifier cartridges or other materials that may require replacement. The water quality information can include information sensed by sensors with the point of delivery monitoring and/or control system 104.

The water system operator 102 and the end user/consumer 100 also have a relationship as shown in FIG. 5 in that the water system operator 102 bills the end user/consumer 100 for water usage, replenishment of consumables such as replacement water filter purifiers, and related services. The end user or consumer 100 provides payment 106 for the water and related consumables or services. The billing and payment information may be exchanged in any number of ways either conventional or otherwise. In addition, the water system operator 102 may provide a warranty or guarantee 108 of the quality of the water to the end user or consumer 100. The water system operator is able to do so because the water system operator is able to provide end-to-end control of water quality. This is highly advantageous to both the end/user consumer 100 as well as the water system operator 102 as the consumer can feel secure that their water is safe to drink while the water system operator is able to obtain premium pricing on their water or related services.

Figure 6A:
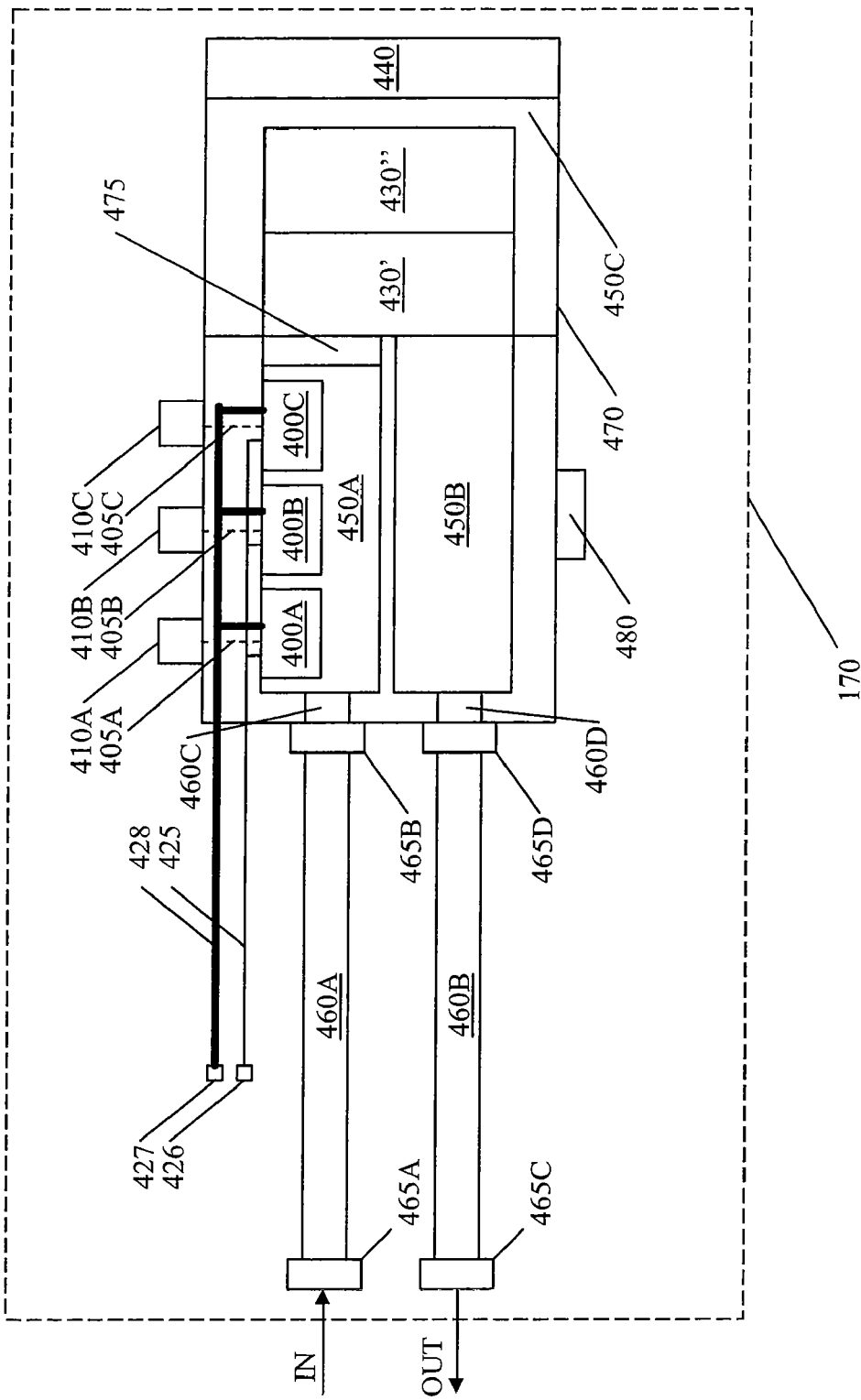
FIG. 6A is an illustration of the preferred water filter/purifier with primary and secondary filter/purifiers designed for specific purposes arranged in serial in the same housing.

FIG. 6A is an illustration of the preferred water filter/purifier with primary and secondary filter/purifiers designed for specific purposes arranged in serial in the same housing.

The water filter/purifier 170 which is preferably constructed in accordance with or certified by the NSF/ANSI Standard 42 or 53. NSF ANSI Standard 42 is entitled "Drinking Water Treatment Units—Aesthetic Effects." This standard covers point-of-use (POU) and point-of-entry (POE) systems designed to reduce specific aesthetic or non-health related contaminants (chlorine, taste and odor, and particulates) that may be present in public or private drinking water. NSF/ANSI Standard 53 is entitled "Dinking Water Treatment Units—Health Effects." This standard is directed towards point-of-use (POU) and point-of-entry (POE) systems designed to reduce specific health-related contaminants, such as *Cryptosporidium, Giardia*, lead, volatile organic chemicals (VOCs), MTBE (methyl tertiary-butyl ether), that may be present in public or private drinking water.

The water filter/purifier 170 may optionally include at least one water quality sensor. As shown in FIG. 6A, water quality sensors 400A, 400B, and 400C are operatively connected to the filter/purifier 170. Alternatively, water quality sensors 400A, 400B, and 400C could be located at the end user or consumer's point of use, while the filter/purifier could be located at or near the end user or consumer's point of entry into the building, which may a single tenant dwelling, a multiple unit tenant dwelling, a single tenant commercial, industrial, retail, manufacturing building, etc., or a multiple tenant commercial, industrial, retail, manufacturing, warehousing building, etc. Each water sensor can be a sensor of any number of types based in part on the particular water quality needs of a location and the characteristics of water typically supplied to that location. Water quality sensors may be used to read water for a variety of chemical and biological agents as well as clarity, rate of movement, and other physical properties or characteristics of the water. Monitored water quality factors may include pH, dissolved carbon dioxide, dissolved oxygen, biological oxygen demand (BOD), conductivity or dissolved solids, suspended solids, turbidity, or other factors. The water quality sensors may also integrate control functionality such as set limits, regulator and P/PI/PID control functions. Water quality sensors can also have simple control relay outputs. The water quality sensor may include the ability to self-calibrate, perform various self-test functions, and generate event triggers, or incorporate other types of features as may be appropriate in a particular installation.

As shown in FIG. 6A, each of the water quality sensors 400A, 400B, 400C is electrically connected to an LED 410A, 410B, 410C through LED wire 405A, 405B, 405C. The LEDs 410A, 410B, 410C function as visible indicator lights to provide visual feedback to a consumer. For example, the presence of the light may indicate a positive or negative water quality, the condition of the filter/purifier, or other states of the filter/purifier.

A communication interface 426 is also shown. The communication interface 426 electrically connects the water quality sensors 400A, 400B, and 400C to a network or directly to a computing device. The present invention contemplates that the communication may be of numerous types, including a parallel network, a serial network, or other type of network device. Power wire 427 is used to provide electricity for powering the water quality sensors.

The water filter/purifier 170 includes two replacement filter/purifier cartridges 430', 430". The replaceable filter/purifier cartridges 430', 430" are preferably designed or selected to filter and purify water according to local conditions and needs. Filtration and purification methods include, but are not limited to, membranes, iodine, chlorine, ultra-violet radiation, iodinated resin, reverse osmosis, charcoal or carbon, and other filtration and purification methods. An expanded definition of some filtration methods are shown in Chart 1.

CHART 1

Carbon Bed—Granular Activated Carbon.
Compressed Carbon—Activated Carbon is molded, bonded or extruded to form a more solid or rigid form.
Ceramic—Candle-like shell with Activated Carbon bonded into it or Granular Activated Carbon inside.
Precoat—Very fine activated carbon bonds to the outside of a pleated fabric septum forming a tight, spongy filtering layer.
Reverse Osmosis—Spiral wound semi-permeable membrane reduces minerals and salts from the water. Usually paired with an Activated Carbon system.

An expanded definition of some purification methods are shown in Chart 2.

CHART 2

Ultra-Violet Light—Uses certain wavelengths of light to destroy bacteria and viruses. Usually paired with a fine filter to reduce cysts. Requires electricity.
Iodinated Resin—When water flows through the resin, it releases Iodine to penetrate and kill bacteria and viruses. If there is enough contact time, cysts will also be killed. Systems are usually paired with a fine filter to reduce the cysts.
Membrane—An exceptionally fine, tight, sub-micron technology with the ability to reduce bacteria, viruses and cysts, along with other contaminants.
Ozone—Ozone injected into the water will reduce, bacteria and viruses. It will also kill cysts if there is enough contact time. Requires electricity. Excess ozone must be removed.
Distillation—Boils the water, causing evaporation, captures the vapors and condenses them into water. Bacteria, viruses and cysts are destroyed. Minerals and salts are also removed. Requires electricity.

These various methods may be employed alone or in various combinations. A cartridge cover 440 is positioned on the replaceable filter/purifier cartridges 430', 430". The cartridge cover 440 may be a removable lid which includes a seal to prevent water from leaking out of the replacement filter/purifier cartridge 430. The lid is operatively connected in any number of ways such as through attachment with fasteners or the lid may form integral threads to screw into a thread on the housing 470 of the water filter/purifier 170. Disposed within the housing 470 of the filter/purifier 170 are chambers 450A, 450B, and 450C. The internal, integral chambers in the housing carry water through an optional sensor bank to the filter/purifier cartridge 430 and then out of the water filter/purifier 170 to the point-of-use.

The filter/purifier 170 also includes an input tube 460A and an output tube 460B. The input tube 460A is connected between fitting 465A and fitting 465B. There is a second input tube 460C also shown. The output tube 460B is connected between fitting 465C and fitting 465F. There is also a second output tube 460D shown.

A valve 475 is also shown. The valve regulates the flow of liquid and may be operated electronically. The valve also can act as a black flow preventer. An outflow fitting 480 is also shown. The purpose of the outflow fitting 480 is to allow water filter/purifier units to be daisy changed in order to provide a second, third, or otherwise subsequent stage of filtering in which different contaminants are removed. The outflow fitting 480 can also be used to interface options such as, but not limited, to ultraviolet purifier for microbial control or even for chlorine and chloramines removal. The outflow fitting 480 can also be used for TOC reduction and ozone removal.

Figure 6B:
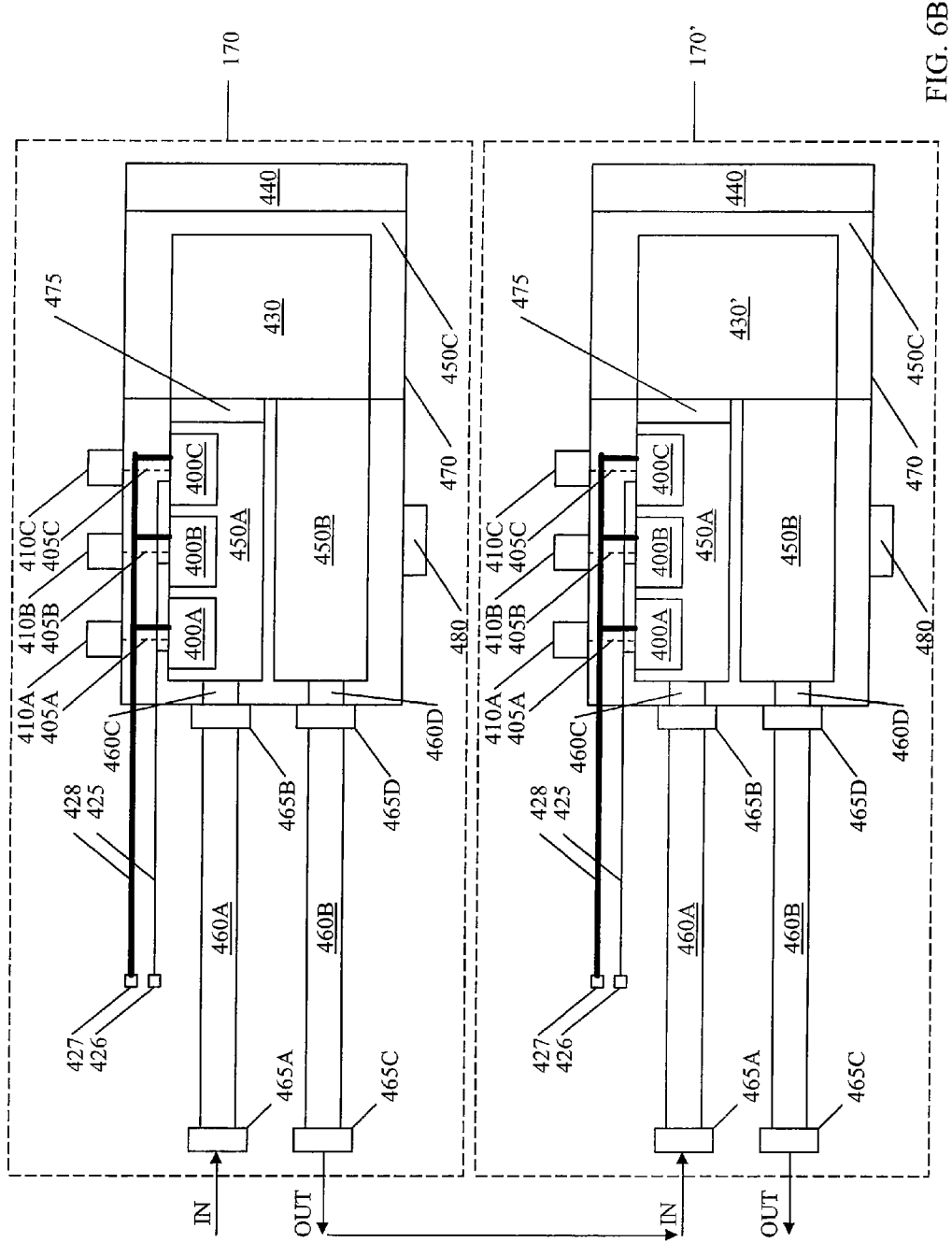
FIG. 6B is an illustration of the preferred water filter/purifier with a primary filter/purifier designed for specific purpose connected in serial to a second water filter/purifier with a secondary water filter/purifier which is designed for a specific purpose.

FIG. 6B is an illustration of the preferred water filter/purifier with a primary filter/purifier designed for specific purpose connected in serial to a second water filter/purifier with a secondary water filter/purifier which is designed for a specific purpose.

The water filter/purifiers 170', 170" are preferably constructed in accordance with or certified by the NSF/ANSI Standard 42 or 53. NSF ANSI Standard 42 is entitled "Drinking Water Treatment Units—Aesthetic Effects." This standard covers point-of-use (POU) and point-of-entry (POE) systems designed to reduce specific aesthetic or non-health related contaminants (chlorine, taste and odor, and particulates) that may be present in public or private drinking water. NSF/ANSI Standard 53 is entitled "Dinking Water Treatment Units—Health Effects." This standard is directed towards point-of-use (POU) and point-of-entry (POE) systems designed to reduce specific health-related contaminants, such as *Cryptosporidium, Giardia*, lead, volatile organic chemicals (VOCs), MTBE (methyl tertiary-butyl ether), that may be present in public or private drinking water.

The water filter/purifiers 170', 170" may optionally include at least one water quality sensor. As shown in FIG. 6B, water quality sensors 400A, 400B, and 400C are operatively connected to the filter/purifier 170. Alternatively, water quality sensors 400A, 400B, and 400C could be located at the end user or consumer's point of use, while the filter/purifier could be located at or near the end user or consumer's point of entry into the building, which may a single tenant dwelling, a multiple unit tenant dwelling, a single tenant commercial, industrial, retail, manufacturing building, etc., or a multiple tenant commercial, industrial, retail, manufacturing, warehousing building, etc. Each water sensor can be a sensor of any number of types based in part on the particular water quality needs of a location and the characteristics of water typically supplied to that location. Water quality sensors may be used to read water for a variety of chemical and biological agents as well as clarity, rate of movement, and other physical properties or characteristics of the water. Monitored water quality factors may include pH, dissolved carbon dioxide, dissolved oxygen, biological oxygen demand (BOD), conductivity or dissolved solids, suspended solids, turbidity, or other factors. The water quality sensors may also integrate control functionality such as set limits, regulator and P/PI/PID control functions. Water quality sensors can also have simple control relay outputs. The water quality sensor may include the ability to self-calibrate, perform various self-test functions, and generate event triggers, or incorporate other types of features as may be appropriate in a particular installation.

As shown in FIG. 6B, each of the water quality sensors 400A, 400B, 400C are electrically connected to an LED 410A, 410B, 410C through LED wire 405A, 405B, 405C. The LEDs 410A, 410B, 410C function as visible indicator lights to provide visual feedback to a consumer. For example, the presence of the light may indicate a positive or negative water quality, the condition of the filter/purifier, or other states of the filter/purifier.

A communication interface 426 is also shown. The communication interface 426 electrically connects the water quality sensors 400A, 400B, and 400C to a network or directly to a computing device. The present invention contemplates that the communication may be of numerous types, including a parallel network, a serial network, or other type of network device. Power wire 427 is used to provide electricity for powering the water quality sensors.

The water filter/purifier 170' includes one replacement filter/purifier cartridge 430 designed for a specific purpose. The water filter/purifier 170" includes one replacement filter/cartridge 430" designed for a specific purpose. The replaceable filter/purifier cartridges 430', 430" are preferably designed or selected to filter and purify water according to local conditions and needs. Filtration and purification methods include, but are not limited to, membranes, iodine, chlorine, ultraviolet radiation, iodinated resin, reverse osmosis, charcoal or carbon, and other filtration and purification methods. An expanded definition of some filtration methods are shown in Chart 1.

CHART 1

Carbon Bed—Granular Activated Carbon.
Compressed Carbon—Activated Carbon is molded, bonded or extruded to form a more solid or rigid form.
Ceramic—Candle-like shell with Activated Carbon bonded into it or Granular Activated Carbon inside.
Precoat—Very fine activated carbon bonds to the outside of a pleated fabric septum forming a tight, spongy filtering layer.
Reverse Osmosis—Spiral wound semi-permeable membrane reduces minerals and salts from the water. Usually paired with an Activated Carbon system.

An expanded definition of some purification methods are shown in Chart 2.

CHART 2

Ultra-Violet Light—Uses certain wavelengths of light to destroy bacteria and viruses. Usually paired with a fine filter to reduce cysts. Requires electricity.
Ultra-Violet Light—Uses certain wavelengths of light to destroy bacteria and viruses. Usually paired with a fine filter to reduce cysts. Requires electricity.
Iodinated Resin—When water flows through the resin, it releases Iodine to penetrate and kill bacteria and viruses. If there is enough contact time, CHART 2-continued cysts will also be killed. Systems are usually paired with a fine filter to reduce the cysts.
Membrane—An exceptionally fine, tight, sub-micron technology with the ability to reduce bacteria, viruses and cysts, along with other contaminants.
Ozone—Ozone injected into the water will reduce, bacteria and viruses. It will also kill cysts if there is enough contact time. Requires electricity. Excess ozone must be removed.
Distillation—Boils the water, causing evaporation, captures the vapors and condenses them into water. Bacteria, viruses and cysts are destroyed. Minerals and salts are also removed. Requires electricity.

These various methods may be employed alone or in various combinations. A cartridge cover 440 is positioned on the replaceable filter/purifier cartridges 430', 430". The cartridge cover 440 may be a removable lid which includes a seal to prevent water from leaking out of the replacement filter/purifier cartridges 430', 430". The lid is operatively connected in any number of ways such as through attachment with fasteners or the lid may form integral threads to screw into a thread on the housing 470 of the water filter/purifiers 170', 170". Disposed within the housings 170', 170" of the filter/purifiers 170', 170" are chambers 450A, 450B, and 450C. The internal, integral chambers in the housing carry water through an optional sensor bank to the filter/purifier cartridges 430', 430" and then out of the water filter/purifiers 170' to 170" to the point-of-use.

The filter/purifiers 170', 170" also includes an input tube 460A and an output tube 460B. The input tube 460A is connected between fitting 465A and fitting 465B. There is a second input tube 460C also shown. The output tube 460B is connected between fitting 465C and fitting 465F. There is also a second output tube 460D shown.

A valve 475 is also shown. The valve regulates the flow of liquid and may be operated electronically. The valve also can act as a black flow preventer. An outflow fitting 480 is also shown. The purpose of the outflow fitting 480 is to allow water filter/purifier units to be daisy changed in order to provide a second, third, or otherwise subsequent stage of filtering in which different contaminants are removed. The outflow fitting 480 can also be used to interface options such as, but not limited, to ultraviolet purifier for microbial control or even for chlorine and chloramines removal. The outflow fitting 480 can also be used for TOC reduction and ozone removal.

Figure 6C:
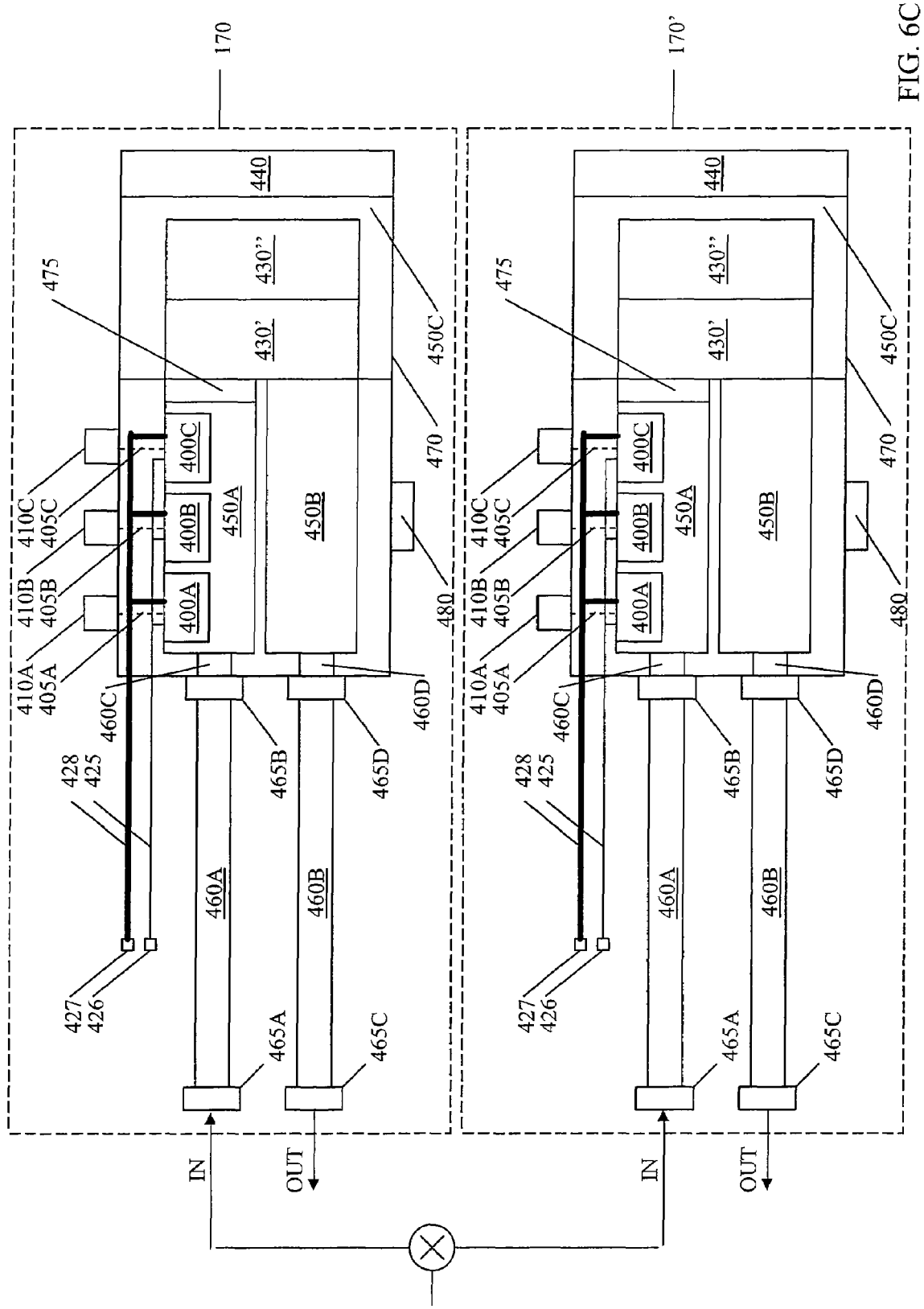
FIG. 6C is an illustration of the preferred water filter/purifier with primary and secondary filter/purifiers designed for specific purposes arranged in parallel with a back-up water filter/purifier.

FIG. 6C is an illustration of the preferred water filter/purifier with primary and secondary filter/purifiers 170', 170" designed for specific water filter/purification cartridges 430', 430" designed for specific purposes. The water filter/purifiers 170', 170" are arranged in parallel, separated by a valve, to provide a back-up, or secondary water filter/purifier.

The present invention provides the only way to guarantee and control water quality to the consumer both domestically and internationally is to use POU systems designed to remove contaminants specified by the local water utilities via filtration and/or purification technologies as described in this patent. The POU systems must be included as an integral part of the existing infrastructure of the public and/or private utilities worldwide. This marketing idea must be mandated and regulated by the EPA, PUC, FEMA, and Homeland Security as part of our domestic water regulatory standards and adopted worldwide by all nations.

Having thus described a preferred embodiment and other embodiments of a system, method, and apparatus for the water system operator's end-to-end control of water quality in a water purification and distribution system to a consumer's point-of-use, at the point-of-entry prior to the point-of-use, near the point-of-entry prior to the point-of-use, etc. through the controlled distribution of water filtration and purification products, it should be apparent to those skilled in the art that certain advantages of the present invention have been achieved. It should also be appreciated that various modifications, adaptations, and alternatives may be made. It is of course not possible to describe every conceivable combination of components for purposes of describing the present invention. All such possible modifications are to be included within the spirit and scope of the present invention which is to be limited only by the following claims.

What is claimed is:

1. A method of providing end-to-end water quality control from a water system operator to a point of delivery proximate a consumer and outside of a water distribution system of the water system operator, comprising:
   treating water using customized filters after the water leaves the water distribution system of the water system operator;
   delivering the water to the consumer at the point of delivery;
   purifying the water at the point of delivery;
   monitoring water quality at the point of delivery;
   reporting water quality at the point of delivery to the water system operator over a network; and
   wherein the customized filters being customized based on the water quality reported to the water system operator over the network.

2. The method of claim 1 wherein the customized filters are deployed in serial in the same housing.

3. The method of claim 1 wherein the customized filters are deployed in serial in different housings.

4. The method of claim 1 wherein the customized filters are deployed in parallel in order to provide a back-up.

5. The method of claim 1 wherein the customized filters located proximate to a consumer, are at the point of entry.

6. The method of claim 1 wherein the customized filters located proximate to a consumer, are between the point of entry and the consumer's point of use.

7. The method of claim 1 wherein the customized filters are located proximate to a consumer are at the point of use.

8. The method of claim 1 wherein the customized filters are located proximate to a consumer, are at the point of entry, and/or between the point of entry and point of use, and/or at the point of use.

9. The method of claim 1 wherein the end-to-end water quality control system is mandated by a controlling authority.

10. The method of claim 9 wherein the controlling authority is a governmental authority.

11. A method for providing a replacement customized water filter, comprising:
    remotely monitoring water quality over a period of time using one or more sensors at a location proximate a water filter to collect water quality data and sending the water quality data over a network;
    customizing a replacement water filter to replace the water filter based on the water quality data;
    determining a replacement time associated with the water filter prior to the replacement time.

12. The method of claim 11 wherein the step of customizing the replacement water filter comprises determining one or more components of the replacement water filter based on the water quality data.

13. The method of claim 11 wherein the step of customizing the replacement water filter includes selecting one or more components from the set consisting of an ultra-violet light component, an iodinated resin component, a membrane component, an ozone component, and a distillation component.

14. The method of claim 11 wherein the replacement water filter provides for purification of water.

15. The method of claim 11 wherein the replacement water filter is housed within a cartridge.

16. The method of claim 11 wherein the replacement water filter comprises a plurality of water filtration and purification components.

17. The method of claim 11 further comprising sending the replacement water filter to a location associated with the water filter.

18. The method of claim 11 further comprising sending the replacement water filter to a customer associated with the location of the water filter.

19. The method of claim 11 further comprising sending the replacement water filter prior to the replacement time.

20. The method of claim 11 wherein the replacement time being based at least in part on the water quality.

* * * * *